Patented Feb. 3, 1953

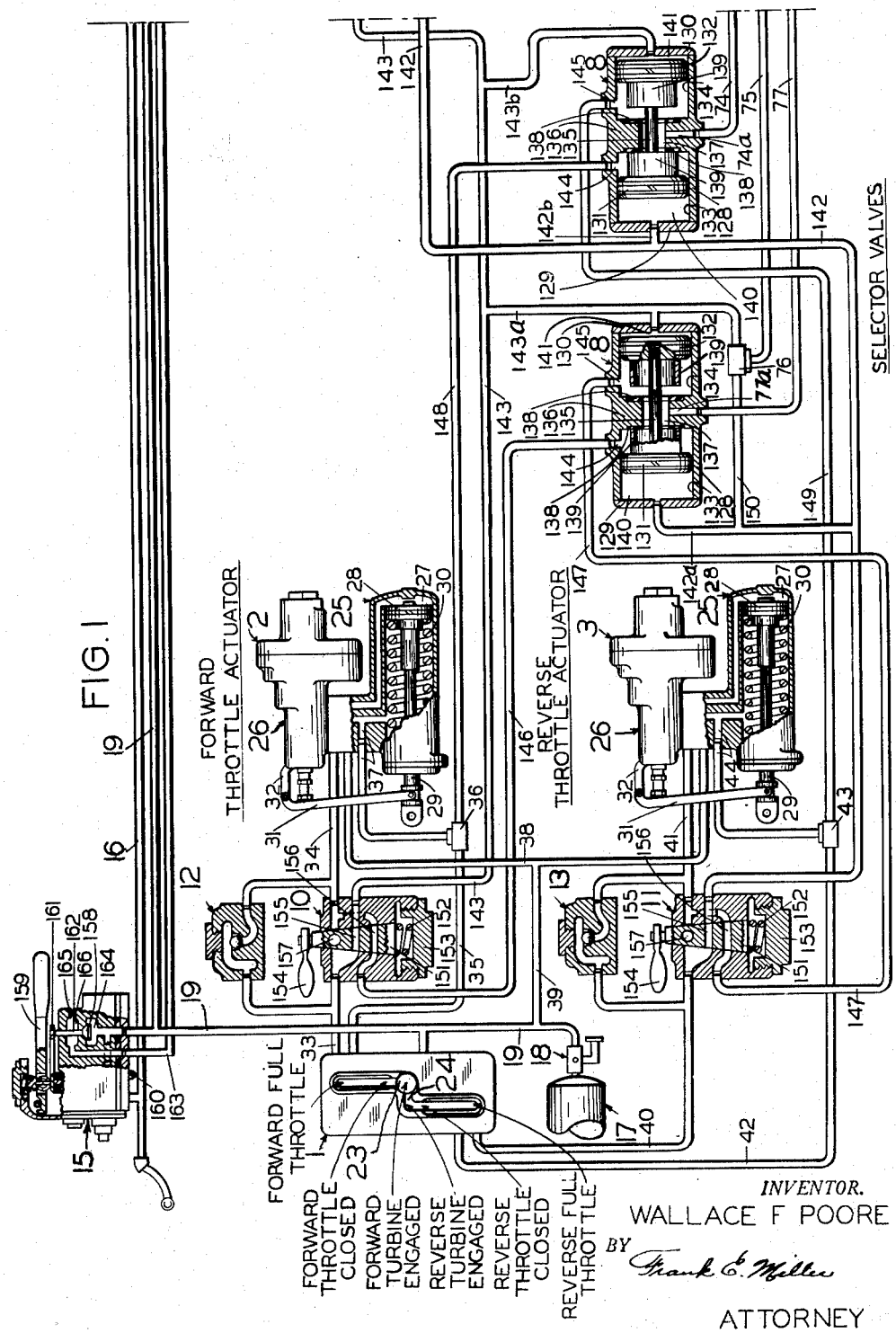

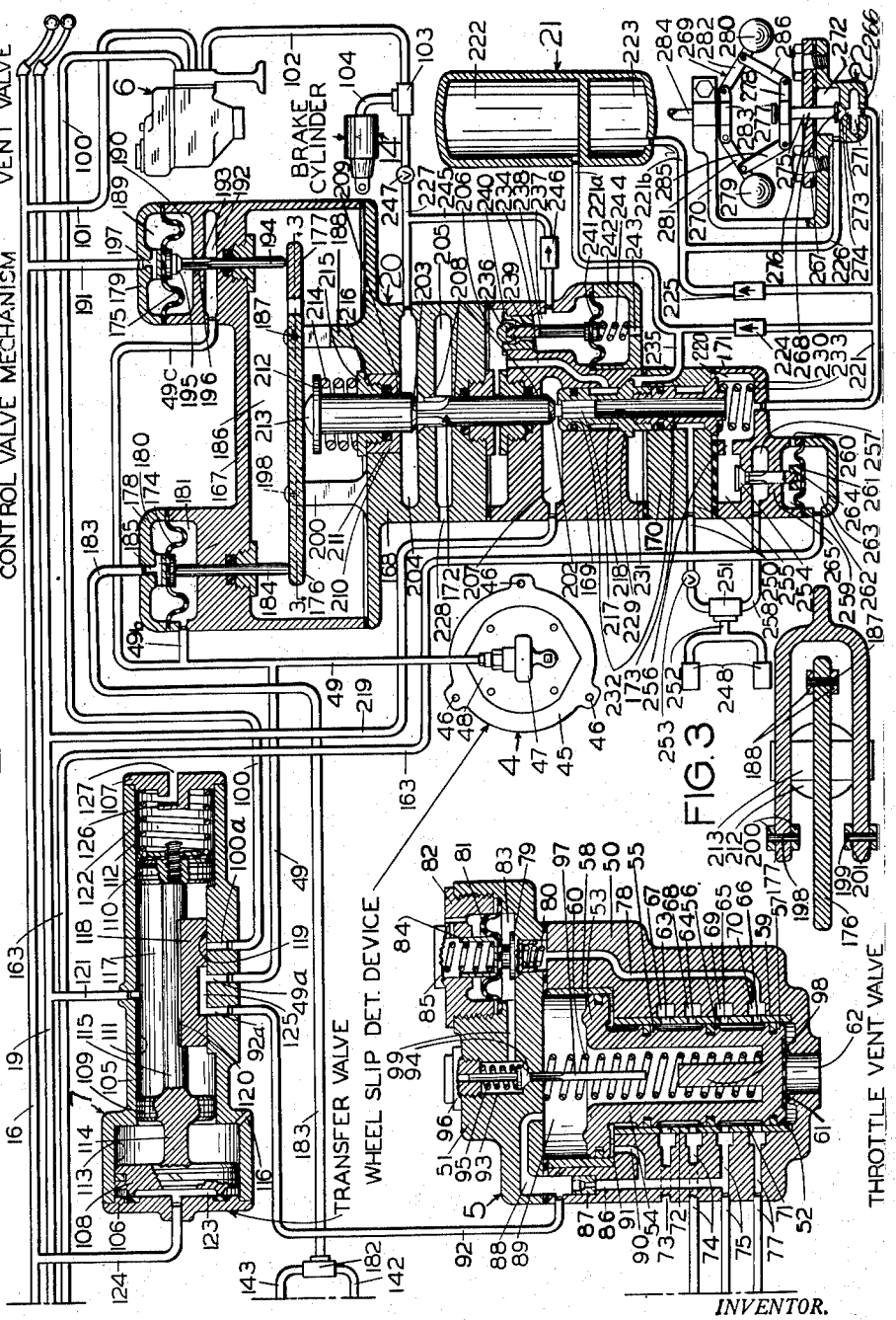

2,627,432

UNITED STATES PATENT OFFICE 2,627,432

APPARATUS FOR CONTROLLING SLIP OF VEHICLE WHEELS

Wallace F. Poore, Wilmerding, Pa., assignor to Westinghouse Air Brake Company, a corporation of Pennsylvania Application July 16, 1947, Serial No. 761,342

17 Claims. (Cl. 291—2)

This invention relates to apparatus for controlling slip of railway vehicle wheels, such as the wheels of a railway locomotive, and has particular relation to control apparatus including means operative in response to the slipping of the driver wheels of the locomotive caused by excessive propulsion power or excessive braking power, for automatically terminating the slipping condition.

The term "slip" or "slipping condition," as employed herein in connection with vehicle wheels, refers to a rotation of the wheels at a speed greater or less than a speed corresponding to actual speed of vehicle travel at a given instant. For convenience in distinguishing between a wheel slip condition occurring due to excessive braking power and one occurring due to excessive propulsion power, the slipping condition of the driver wheels of a vehicle induced by excessive propulsion power may be sometimes referred to hereafter as a "spin" or a "spinning condition." It will be understood, however, that the term "slipping condition" and its variants may be employed hereinafter, particularly in the claims, interchangeably with the term "spinning condition" and its variants.

For the purpose of illustration, my invention is disclosed herein in connection with a pneumatic brake and throttle control apparatus for a locomotive.

In Patent No. 2,512,035 issued to George K. Newell, June 20, 1950, there is disclosed and claimed a pneumatic propulsion and braking control apparatus including an arrangement whereby a brake application and a sanding operation are effected automatically whenever the driver wheels of a vehicle spin due to excessive propulsion power when starting, and a release of the brakes as well as a sanding operation is effected automatically whenever the driver wheels slip due to the application of excessive braking force thereon.

It is an object of my invention to provide a novel and improved arrangement for performing the functions similar to those performed by the apparatus disclosed in the Newell patent with respect to automatic brake and sanding operation responsively to driver wheel spinning or slipping and also additional functions not provided by the apparatus disclosed in the Newell patent.

It is another object of my invention to provide a novel brake and sanding control valve mechanism for use in a propulsion and brake control system of the type disclosed in the Newell patent.

More specifically it is an object of my invention to provide a novel and improved brake and sanding control arrangement operatively responsive to driver wheel spinning and slipping and in which a sanding operation initiated in response to a slipping condition induced by an excessive brake application, is continued automatically, once it is initiated, until such time as the brakes are released or the locomotive is brought substantially to a stop.

The above objects and other objects of my invention which will be made apparent hereinafter are attained by means of an embodiment of my invention subsequently to be described and shown in the accompanying drawings wherein Figures 1 and 2, taken together, show the complete equipment.

Figure 3 is a sectional view, taken on line 3—3 of Figure 2, showing certain details of the brake and sanding valve mechanism of Figure 2.

DESCRIPTION

For the purpose of illustration, the invention is associated with a throttle and brake control apparatus for a turbine driven type of locomotive having a forward turbine for driving the locomotive in a forward direction and a reverse turbine for driving the locomotive in a reverse direction, and is similar to that described in Patent No. 2,512,035 issued to George K. Newell, the throttle control apparatus being also generally like that disclosed in detail in Patent No. 2,501,729 issued to Harry C. May, in view of which the following description will be limited to only that necessary to a clear understanding of the invention.

As shown in the drawings, the throttle control equipment may comprise a manually operated throttle controller 1, hereinafter referred to simply as the controller, a forward direction throttle actuator 2, and a reverse direction throttle actuator 3. The controller 1 is shown only in a plan view and the two actuators 2 and 3 are shown in outline form with only a portion in section since reference may be had to the above-mentioned May patent for details of construction and operation of these devices.

The equipment shown in the drawings further comprises a wheel slip detecting device 4, a throttle vent valve 5, a brake vent valve 6, a transfer valve 7 conditioned automatically depending upon whether a brake application is or is not in effect for rendering the brake vent valve and throttle vent valve alternatively controllable by the wheel slip detecting device 4, two selector valves 8 and 9 of identical construction, two cut-out cocks 10 and 11 of identical construction associated respectively with the forward throttle actuator 2 and the reverse throttle actuator 3, and two check valves 12 and 13, arranged in parallel relation to the cut-out cocks 10 and 11, respectively.

Also shown in the drawings is a fluid pressure brake cylinder 14 for applying or releasing the brakes on one or more pairs of driver wheels (not shown) of the locomotive according to the pressure of fluid established therein, and apparatus under the control of the engineer of the locomotive for controlling the supply of fluid under pressure to and the release of fluid under pressure from the brake cylinder, the latter apparatus being exemplified by a self-lapping brake valve 15 and a control pipe 16, the pressure in which is controlled by the brake valve to determine the degree of application of the brakes. The source of fluid pressure supply both for pneumatic throttle control and brake control purposes is shown as a reservoir 17 from which fluid under pressure is supplied through a feed valve device 18 to a so-called supply pipe 19.

In addition to the above described devices, there is provided according to my invention, a brake and sanding control valve mechanism 20 having associated therewith a two-compartment reservoir 21, and a speed controlled valve device 22.

Various other devices are also included in the equipment and will be described as the description of the equipment progresses.

Considering the parts of the equipment in greater detail, only a plan view of the controller 1 is shown in Figure 1 for the purpose of identifying the different positions of a handle 23 which is operative in a Z-slot 24 of the controller. As will be seen by the legends in the drawing, the controller handle 23 is at the right-hand end of the transverse portion of the Z-slot in what is designated "Forward Turbine Engaged" position. In this position the controller handle is in alignment with one longitudinally extending portion of the Z-slot which constitutes the forward throttle control zone. When the controller handle 23 is shifted a certain initial amount away from the "Forward Turbine Engaged" position in the forward throttle zone it reaches a so-called "Forward Throttle Closed" position. The extremity of the forward throttle zone is designated "Forward Full Throttle" position.

Similarly the left-hand end of the transverse portion of the Z-slot is designated "Reverse Turbine Engaged" position and movement of the controller handle in the longitudinal portion of the Z-slot in alignment with this position is in the reverse throttle zone. A "Reverse Throttle Closed" position and "Reverse Full Throttle" position, corresponding in location to the "Forward Throttle Closed" and "Forward Full Throttle" positions, are provided in the reverse throttle zone.

The various functions performed by the throttle control apparatus in the different positions of the controller handle will be explained in greater detail as the description progresses.

The two throttle actuators 2 and 3 are identical and reference may be had to the hereinbefore mentioned Patent No. 2,501,729 of Harry C. May, for details of construction and operation. These actuators are shown in outline form with only a portion in section. Briefly, each of the actuators 2 and 3 comprises a piston portion 25 and a self-lapping control valve portion 26 for controlling the supply of fluid under pressure to and release of fluid under pressure from a pressure chamber 27 at one side of a piston 28 in the piston portion 25 in accordance with the pressure of fluid supplied to the control valve portion 26. The piston 28 has a stem 29 which operates slidably in a packing seal, a release spring 30 being provided for yieldingly resisting the movement of the piston 28 in response to the pressure of fluid supplied to the pressure chamber 27 and for yieldingly urging the piston back toward an inner position in which it is shown.

A lever 31, pivoted at one end on a bracket 32 attached to the casing of valve portion 26 and having a clevis at the opposite end engaging in an annular groove on the piston stem 29, causes a lapping operation of the self-lapping valve mechanism of the valve portion 26 when the piston 28 and its stem 29 move outwardly in the left-hand direction an amount corresponding to the degree of pressure supplied to the pressure chamber 27.

The piston stem 29 of each of the actuators 2 and 3 is suitably connected to a corresponding throttle valve (not shown) for controlling the supply of steam to the forward direction turbine and to the reverse direction turbine, respectively, in accordance with the degree of outward movement of the stem 29 which, in turn, corresponds to the degree of pressure supplied to the control valve portion 26 of the actuator.

Fluid under pressure is supplied selectively to the throttle actuators 2 and 3 under the control of the controller 1, depending upon the position of the controller handle 23. Thus, in the "Forward Turbine Engaged" position of the controller handle 23 in which it is shown, the controller 1 is operative to supply fluid under pressure to a pipe 33, hereinafter designated the forward throttle pipe, at a pressure between six and eight pounds per square inch, which, as will be hereinafter described in greater detail, will be supplied directly or indirectly to a pipe 34 connected to the forward throttle actuator 2, depending upon the position of the cut-out cock 10. Fluid under pressure from the pipe 34 is conducted to the control valve portion 26 of the actuator 2 but no actual operation occurs in response to such pressure.

At the same time, the controller 1 is operative to supply fluid at the pressure in the supply pipe 19 to a pipe 35 through which it is conducted to and acts on the valve element of a double check valve 36 to establish communication between the pipe 35 and a pipe and passage 37 leading to the forward throttle actuator 2. Fluid under pressure from the pipe 37 is supplied to the chamber on the spring side of the piston in the piston portion 25 of the actuator and also to a release insuring valve device (not shown) forming part of the control valve portion 26 of the actuator and which is operative to insure the venting of fluid under pressure from the pressure chamber 27 associated with the piston 28 in the piston portion 25. It will thus be seen that in the "Forward Turbine Engaged" position of the controller handle 23, the piston 28 of the actuator 2 is positively held in its inner-most position.

When the controller handle 23 is shifted in the forward control zone to the "Forward Throttle Closed" position, the controller 1 is operative to vent fluid under pressure from the pipe 35, hereinafter designated the forward release pipe, and consequently from the chamber at the spring side of the piston 28 of the actuator 2 as well as from the release insuring valve device. Such venting of fluid under pressure from the chamber at the spring side of the actuator piston 28 as well as from the release insuring valve device conditions the actuator to be actuated in response to the supply of fluid under pressure to the pressure chamber 27 associated with the piston of the actuator. At the same time, the controller is so constituted as to effect an increase of the pressure supplied through the forward throttle pipe 33 to the control valve portion 26 of the actuator 2 to a higher value, such as ten pounds per square inch. The control valve portion 26 of the actuator 2 accordingly operates in response to such pressure of ten pounds per square inch to cause fluid under pressure to be supplied from a supply pipe 38 to the pressure chamber 27 of the actuator piston. The supply pipe 38 is connected by a branch pipe 39 to the supply pipe 19. The actuator piston 28 moves outwardly a certain amount corresponding to the pressure of fluid supplied to the control valve portion 26. Such amount of movement of the piston stem 29 is effective to operate the throttle valve controlling the supply of steam to the forward direction turbine in a manner to supply steam insufficient in amount to operate the turbine but sufficient to effect a warming up of the turbine.

As the controller handle is shifted out of the "Forward Throttle Closed" position progressively toward the "Forward Full Throttle" position, the controller 1 is operative to supply fluid at a correspondingly increased pressure to the forward throttle pipe 33 and thus to the control valve portion 26 of the forward throttle actuator 2. The piston 28 of the actuator 2 is thus moved outwardly to shift the piston stem 29 in the left-hand direction, as seen in the drawing, an increased amount in correspondence with the pressure of the fluid delivered to the control valve portion 26. When the controller handle 23 reaches the "Forward Full Throttle" position, the controller 1 is operative to supply the maximum fluid pressure to the forward throttle pipe 33 and thus to the control valve portion of the actuator 2. Accordingly, the actuator piston stem 29 is actuated a maximum amount in the left-hand direction out of its innermost position to effect full throttle valve opening.

When the controller handle 23 is returned from the "Forward Full Throttle" position to the "Forward Throttle Closed" position the pressure of the fluid supplied to the forward throttle pipe 33 and thus to the control valve portion 26 of actuator 2 is progressively reduced in correspondence with the return movement of the controller handle. Restoration of the controller handle 23 to the "Forward Turbine Engaged" position causes restoration of the supply of fluid under pressure to the forward release pipe 35 and the consequent supply of fluid under pressure to the chamber at the spring side of the actuator piston 28 and to the release insuring valve device which effects an independent release of fluid under pressure from the pressure chamber 27 of the actuator piston 28.

When it is desired to operate the locomotive in a reverse direction, the controller handle 23 is shifted transversely in a left-hand direction through the transverse portion of the Z-slot 24 to approximately the mid-point thereof. Suitable mechanism, not shown, is provided for preventing further movement of the controller handle unless the driver wheels of the locomotive are completely stopped. Assuming that the driver wheels are completely stopped, the controller handle 23 can then be shifted further in the left-hand direction to the "Reverse Turbine Engaged" position.

In this position of the controller handle 23, the controller 1 is operative to cause engagement of the clutch device, not shown, for connecting the reverse direction turbine to drive the driver wheels.

When the controller handle 23 is still in the "Reverse Turbine Engaged" position, the controller 1 is also operative to cause fluid under pressure to be supplied to a so-called reverse throttle pipe 40 at a pressure between six and eight pounds per square inch, such fluid under pressure being supplied, directly or indirectly, under the control of the cut-out cock 11 in a manner hereinafter more fully explained, to a pipe 41 connected to the reverse throttle actuator 3. The pipe 41 corresponds in function to the pipe 34 of the forward throttle 2 in that fluid under pressure is delivered therefrom to the control valve portion 26 of the reverse throttle actuator 3 to effect operation of the actuator piston 28 in a manner similar to that previously described for the forward throttle actuator 2. As in the case of the forward throttle actuator, the pressure of six to eight pounds per square inch supplied to the control valve portion 26 of the reverse throttle actuator 3 is ineffective to cause operation of the actuator piston.

At the same time, while the controller handle 23 is in the "Reverse Turbine Engaged" position, the controller 1 is operative to supply fluid under pressure from the supply pipe 19 to a so-called reverse release pipe 42, the pressure in which is effective to shift the valve element of a double check valve 43 to cause flow of fluid under pressure from the pipe 42 to a pipe and passage 44 leading to and connected to the reverse throttle actuator 3. The pipe 44 corresponds to the pipe 37 for the forward throttle actuator 2 and functions to deliver fluid under pressure to the chamber at the spring side of the actuator piston 28 and to the release insuring valve device of the actuator 3 in a manner similar to that described when fluid under pressure is supplied to the pipe 37 for the forward throttle actuator 2.

In this connection, it should be understood that the supply of fluid under pressure to the reverse release pipe 42 is maintained while the controller handle 23 is in the "Forward Throttle Control" zone, thereby insuring against the operation of the reverse throttle actuator at such time. Conversely, it should be understood that the supply of fluid under pressure to the forward release pipe 35 is maintained for insuring against operation of the forward throttle actuator 2 while the controller handle 23 is operated in the reverse throttle control zone.

When the controller handle 23 is shifted out of the "Reverse Turbine Engaged" position into the "Reverse Throttle Closed" position, fluid under pressure is vented from the reverse release pipe 42 to effect the corresponding conditioning of the reverse throttle actuator 3 in response to the supply of a substantially higher pressure of approximately ten pounds per square inch simultaneously effected to the reverse throttle pipe 40. As in the case of the "Forward Throttle Closed" position, the supply of fluid under pressure to the reverse throttle actuator control valve portion 26 while the controller handle 23 is in its "Reverse Throttle Closed" position is effective to cause fluid under pressure to be supplied at a corresponding pressure to the pressure chamber 27 of the actuator piston. The stem 29 of the piston 28 of the reverse throttle actuator 3 is accordingly shifted a certain amount in the left-hand direction to effect the supply of steam to the reverse direction turbine insufficient in amount to effect operation thereof but sufficient to effect warming up thereof.

When the controller handle 23 is shifted progressively from the "Reverse Throttle Closed" position towards the "Reverse Full Throttle" position, the controller 1 is operative to supply a progressively increasing pressure to the reverse throttle pipe 41 and thus to the control valve portion 26 of the reverse throttle actuator 3, the maximum fluid pressure being supplied when the controller handle reaches the "Reverse Full Throttle" position. The piston 29 of actuator 3 is thus correspondingly shifted an increasing amount in the left-hand direction, in correspondence with the degree of pressure supplied to the control valve portion 26 of the actuator, to effect a correspondingly greater amount of steam to the reverse direction turbine.

Upon the restoration of the controller handle 23 from the "Reverse Full Throttle" position through the "Reverse Throttle Closed" position to the "Reverse Turbine Engaged" position, the pressure of fluid delivered through the reverse throttle pipe 41 to the control valve portion 26 of the reverse throttle actuator 3 is progressively reduced to effect a corresponding return movement of the actuator piston 28.

The wheel-slip detecting device 4 is shown in Figure 2 of the drawings in outline form only since reference may be had, for details of this device, to Patent No. 2,447,710 issued to Joseph C. McCune and George K. Newell. Briefly, however, it comprises a suitable casing 45 having a plurality of attaching brackets 46 whereby the casing may be attached to a suitable portion of the locomotive structure. Rotatably mounted on a rotary spindle journaled in the casing 45, is a fly-wheel which is driven in response to rotation of the spindle through a yielding connection which permits a rotary movement of the fly-wheel relative to the spindle, in either a leading or a lagging direction, substantially proportionally to the rate of deceleration and acceleration of the spindle. Whenever the rate of deceleration or acceleration of a driver wheel exceeds a certain value, attained only when the wheel is slipping or spinning, for example a rate of deceleration or acceleration which is the equivalent of ten miles per hour per second, the leading or lagging rotary movement of the fly-wheel with respect to the spindle is transmitted to effect operation of a so-called pilot valve device 47 contained within a removable end plate 48.

The spindle for driving the fly-wheel may be connected in any suitable manner for rotation in accordance with the rotation of a pair of driver wheels, as through a flexible shaft having a roller on the end thereof which engages the tread of the driver wheels in frictional contact. As will be explained more fully hereinafter, the pilot valve device 47 of the wheel-slip detecting device 4 is effective when operated in response to the predetermined rate of deceleration or acceleration of the driver wheels to effect venting to atmosphere of a pipe 49 hereinafter designated the pilot valve pipe.

The throttle vent valve 5 is adapted to be operated, in the manner more fully explained hereinafter, under the control of the wheel-slip detecting device 4 to effect a throttle closing operation of both the forward throttle actuator 2 and the reverse throttle actuator 3 whenever spinning of the locomotive driver wheels occurs, for the purpose of terminating the spinning condition automatically. Such control of the actuators 2 and 3 by the throttle vent valve 5 may be cut-out of operation, if desired, by means of the cut-out cocks 10 and 11 in a manner more fully to be described hereinafter.

Before proceeding to a description of the manner in which the throttle vent valve causes a throttle closing operation of the actuators 2 and 3 it will be necessary first to describe in detail the construction and operation of the throttle vent valve 5 itself. The throttle vent valve 5 comprises a sectionalized casing having a body section 50 and a cap section 51. Contained in the body section 50 is a piston valve device 52 comprising an annular piston 53 having a tubular stem 54 on which are formed at spaced intervals thereon a plurality of pistons 55, 56 and 57, the piston 57 forming the closed end of the stem 54 on the opposite extremity from the piston 53.

The piston 53 operates in a suitable bushing 58 suitably fixed in a bore formed in the casing and the pistons 55, 56 and 57 operated in a bushing 59 suitably secured in a counterbore formed in the casing. A spring 60 interposed between the cap section 51 and the closed end of the tubular stem 54 urges the piston 57 downwardly to the position in which it is shown. In such position, a gasket secured in the outer face of the piston 57 seats on an annular rib seat 61 to close an exhaust port 62.

The bushing 59 is provided with four series of circumferentially arranged ports 63, 64, 65 and 66 respectively, spaced longitudinally therealong at substantially equal intervals, which ports open into annular chambers 67, 68, 69 and 70 respectively, surrounding the bushing 59.

In the position of the piston valve device 52, in which it is shown in Figure 2, an annular cavity 71 formed between the pistons 56 and 57 connects the two series of ports 65 and 66, thereby connecting the two annular chambers 69 and 70.

In a similar manner, an annular cavity 72 formed between pistons 55 and 56 connects the two series of ports 63 and 64, thereby connecting the two annular chambers 67 and 68.

Chamber 67 is constantly connected to atmosphere through an exhaust port 73. The chamber 68 is connected by a passage and pipe 74 to the selector valve 9. The chamber 69 is connected by a passage and pipe 75 to the delivery port of a double check valve 76, fluid under pressure being supplied to the two input ports at opposite ends of check valve 76 alternatively from the forward throttle pipe 33 and from the reverse throttle pipe 40 under the control of the cut-out cocks 10 and 11 respectively, in a manner more fully described hereinafter. The chamber 70 is connected by a passage and pipe 77 to the selector valve 8.

Chamber 70 is also connected by a passage 78 to the inner seated area of a poppet type valve 79, hereinafter designated the pressure reduction valve. A spring 80 interposed between the valve 79 and the upper contact face of the body casing section 50 tends to unseat the valve 79 upwardly from a valve seat formed in the cap section 51. A diaphragm 81, clamped along the periphery thereof by a screw plug 82 forms a closed chamber 83 surrounding the valve 79. A cup-shaped, piston type follower 84, slidably operable in a bore formed in the screw plug 82 and biased downwardly by a spring 85 into engagement with the upper face of the diaphragm 81, causes the lower face of the diaphragm to engage the valve 79 to hold it in a seated position in opposition to the spring 80.

The passage 75 opening out of the chamber 69 is connected by a branch passage 86, in which a choke fitting 87 is interposed, to a cavity 88 in the cap section 51 which opens into a piston chamber 89 above the annular piston 53. A branch passage 90 connects the passage 86 to an annular chamber 91 formed at the underside of the annular piston 53 and between the piston 53 and the piston 55.

The piston chamber 89 is connected through the cavity 88 and a pipe 92 to the transfer valve 7 which, as will hereinafter be explained, serves to connect the pipe 92 to the pilot valve pipe 49 leading to the wheel-slip detecting device 4 while the brakes on the locomotive are released in response to the absence of pressure in the brake control pipe 16.

Also formed in the cap section 51 is a bore 93, at the lower end of which is formed a valve seat surrounding a port opening into the piston chamber 89, on which seat a valve 94 of the poppet type is resiliently seated by a coil spring 95 interposed between the upper face of the valve and a screw plug 96 closing the open end of the bore 93. The valve 94 also has a stem 97, including a fluted portion immediately adjacent said valve, said stem extending downwardly through the piston chamber 89 in coaxial relation within the tubular stem 54 of the piston valve device 52 and terminating at a point having a predetermined spaced relation to a projecting lug or pin 98 formed on the inner face of the piston 57. When the piston 53 is shifted upwardly, in the manner hereinafter to be described, the pin 98 engages the end of the stem 97 of the valve 94 to effect unseating of the valve.

The chamber 83 at the lower side of the diaphragm 81 is connected by a passage 99 to the bore 93 above the valve 94.

By way of preliminary description of the operation of the throttle vent valve 5, let it be supposed that fluid under pressure is supplied to the pipe 75 in response to the supply of fluid under pressure to the forward throttle pipe 33 or the reverse throttle pipe 40 under the control of the controller 1. By reason of the connection between the annular chambers 69 and 70 by cavity 71, fluid under pressure is supplied to the pipe 77 and through the passage 78 to the inner seated area of the pressure reduction valve 79. At the same time, fluid under pressure flows through the branch passages 86 and 90 to the annular chamber 91 on the underside of the piston 53 while also flowing at a somewhat restricted rate through the choke-fitting 87 and cavity 88 to the piston chamber 89. The spring 60 is of such strength as to maintain the piston valve device 52 in the position in which it is shown in Figure 2, by reason of the fact that insufficient differential pressure is created on the piston 53 to effect upward movement of the piston 53 in opposition to the spring 60.

Fluid under pressure is also supplied by way of the pipe 92 and transfer valve 7 to the pilot valve pipe 49 which is correspondingly charged to the pressure established in piston chamber 89. When the pressure of the fluid supplied to the inner seated area of the pressure reduction valve 79 exceeds a certain pressure, of the order of eighteen pounds per square inch, the force of the spring 85 is overcome and the valve is shifted slightly from its seat, whereupon the pressure of the fluid supplied to the chamber 83 on the underside of the diaphragm 81 is effective to urge the follower 84 positively upward to its uppermost position enabling the spring 80 to unseat the valve 79 to its fullest extent. The pressure of the fluid in the chamber 83 is also effective through the passage 99 and bore 93 on the valve 94 to assist the spring 95 in maintaining the valve seated in opposition to the pressure active on the inner seated area thereof in the piston chamber 89.

By reason of the connection of the piston chamber 89 to the pilot valve pipe 49 controlled by wheel-slip detecting device 4 it will be seen that unseating of the pilot valve device 47 in response to the occurrence of a spinning condition of the driver wheels of the locomotive will effect instantaneous venting of fluid under pressure from the piston chamber 89 at a rapid rate. Due to the restriction offered by the choke-fitting 87 to the supply of fluid under pressure from the passage 86 to the piston chamber 89, the pressure in the chamber 89 will reduce at a much faster rate than the pressure in the chamber 91 on the underside of the piston 53. Consequently a sufficient differential force will be promptly created on the piston 53 effective to shift it upwardly to its uppermost position engaging the contact face of the cap section 51 open to the chamber 89.

In such position of the piston valve device 52, the piston 57 is shifted to a point above the ports 66, thereby connecting the pipe 77 and the passage 78 to atmosphere by way of the exhaust port 62.

By reason of the fact that the valve 79 is unseated as well as the valve 94 at this time, it will be seen that the pressure of the fluid in the chamber 89 will thereafter be reduced at a rapid rate past the valve 94, through the passage 99 and chamber 83, past the valve 79, through the passage 78, chamber 70, ports 66, and the exhaust port 62 until such time as the pressure of the fluid active in the chamber 83 on the lower face of the diaphragm 81 reduces to a value of approximately eighteen pounds per square inch, at which time the spring 85 becomes effective to reseat the valve 79 and cut off the further exhaust of fluid under pressure from the chamber 89 therepast.

Assuming that the pilot valve device 47 of the wheel-slip detecting device 4 is closed in response to the termination of the spinning condition of the driver wheels of the locomotive prior to the reseating of the valve 79, it will be seen that the chamber 89 will be promptly recharged by fluid under pressure supplied from the pipe and passage 75 through passage 86, the choke 87, and cavity 88. Due to the slight time interval required to build up a sufficient pressure in the chamber 89 to cause movement of the piston valve device 52 downwardly to the position in which it is shown in the drawing, the pressure in the pipe 77 will reduce further to a lower pressure, such as five pounds per square inch, before the piston 57 of the piston valve device 52 reseats on the annular rib seat 61 to cut off further exhaust of fluid under pressure from the pipe 77.

The brake vent valve 6 is of the type described in detail and claimed in Patent No. 2,366,044 of Joseph C. McCune. It is deemed unnecessary, therefore, to show the details of brake vent valve 6 in the drawing or to describe it in detail. Essentially, however, the brake vent valve 6 is quite similar in construction and operation to the throttle vent valve 5, just previously described. It comprises a piston valve device, similar to the piston valve device 52 of the throttle vent valve 5, and a piston chamber corresponding to the piston chamber 89 of throttle vent valve 5, which is connected by a pipe 100 to the transfer valve 7, the transfer valve being adapted to connect the pipe 100 to the pilot valve pipe 49 in the manner presently to be described.

Except when a wheel slip occurs, the brake vent valve 6 establishes communication between a branch pipe 101 of the control pipe 16 and a pipe 102 leading to one side of a double check valve 103, the delivery port of which is connected by a pipe 104 to the pressure chamber of the brake cylinder 14. With the control pipe 16 charged with fluid at a pressure determined by operation of the brake valve 15 in the manner hereinafter described, fluid under pressure is thus delivered to the brake cylinder 14 to effect application of the brakes on the driver wheels of the locomotive.

Whenever the pressure in the piston chamber of the piston valve device of the brake vent valve 6 is rapidly reduced by operation of the pilot valve device 47 of the wheel-slip detecting device 4 under circumstances later to be described, the piston valve device is operated to cut off the supply of fluid under pressure from the pipe 101 to the pipe 102 and the brake cylinder 14 and, at the same time, establish an exhaust communication through which fluid under pressure is exhausted at a rapid rate from the brake cylinder 14 to atmosphere.

The brake vent valve 6 includes a pressure reduction valve, corresponding to the valve 79 of the throttle vent valve 5, which is effective to terminate the reduction of the pressure in the piston chamber of the piston valve device by way of the same exhaust communication that exhausts the pressure from the brake cylinder, whenever the pressure in the brake cylinder reduces to approximately eighteen pounds per square inch.

Assuming that the pilot valve device 47 of the wheel-slip detecting device 4 is closed, reclosure of the pressure reduction valve of the brake vent valve 6 prevents further reduction of the pressure in the brake cylinder 14 and reopen the supply communication between the pipes 101 and 102 to effect reapplication of the brakes. Actually, due to the time required for the piston chamber of the piston valve device of the brake vent valve 6 to recharge by fluid supplied from the supply pipe 101, the pressure in the brake cylinder 14 will reduce to approximately five pounds per square inch before the supply communication to the brake cylinder is again established.

As previously indicated, the transfer valve 7 is operative to selectively establish the connection of the pilot valve pipe 49 to either the pipe 92 leading to the throttle vent valve 5 or to the pipe 100 leading to the brake vent valve 6. The transfer valve 7 comprises a suitable casing 105 generally cylindrical in form, open at both ends, and closed by end plates 106 and 107 removably attached thereto. Operative in suitable bores provided in the casing 105 is a piston assembly comprising three coaxially related pistons 108, 109 and 110. The two pistons 109 and 110 are of the same diameter and operate in corresponding bores 111 and 112 respectively. The piston 108 is larger in diameter than the pistons 109 and 110 and operates in a corresponding bore 113.

The two pistons 108 and 109 are preferably integrally formed with a connecting stem 114 therebetween and a stem 115 extending to one side of the piston 109 to the end of which the piston 110 is removably secured as by a nut engaging a screw-threaded end portion of the stem 115. The chamber formed between the pistons 108 and 109 is constantly open to atmosphere through a port 116.

Contained in the chamber formed between the two pistons 109 and 110, hereinafter designated the slide valve chamber 117, is a slide valve 118 which operates slidably on a slide valve seat 119 formed on the casing 105 between the two bores 111 and 112. The slide valve 118 is locked in a recess 120 formed in the piston stem 115 so as to be shifted in either direction in response to the movement of the piston assembly.

The slide valve 118 is pressed in sealing contact with the slide valve seat 119 in any suitable manner, as for example, by supplying fluid under pressure from the supply pipe 19 through a branch pipe 121 to the slide valve chamber 117. In such case, by reason of the equivalent areas of the pistons 109 and 110, the fluid pressure forces on the pistons are balanced and the pressure of the fluid in the slide valve chamber 117 in no way interferes with the movement of the piston assembly.

The piston assembly is yieldingly urged in the left-hand direction to a position, in which it is shown in the drawing, wherein an annular rib formed on the outer face of the piston 108 seats in sealing contact on an annular gasket on the inner face of the end plate 106, by means of a coil spring 122 interposed between the outer face of the piston 110 and the inner face of the end plate 107.

A chamber 123 on the outer face of the piston 108 within the sealing rib of the piston is constantly connected by a branch pipe 124 to the control pipe 16. So long as the control pipe 16 is uncharged, as it is while the brakes are released, the piston assembly remains in the position in which it is shown. In this position of the piston assembly, a cavity 125 in the slide valve 118 establishes a connection between two ports 92a and 49a in the slide valve seat 119, and thus between the pipes 92 and 49 respectively connected to these ports. Thus, so long as the control pipe 16 is uncharged, the transfer valve 7 connects the pipe 92 from the throttle vent valve 5 to the pilot valve pipe 49 leading to the wheel-slip detecting device 4, thereby rendering the throttle vent valve subject to the control of the wheel-slip detecting device.

When the control pipe 16 is charged, as it is to initiate a brake application, the fluid at a corresponding pressure active in chamber 123 on the outer face of the piston 108 exerts a force urging the piston assembly in the right-hand direction. When the pressure of the fluid in the chamber 123 exceeds a certain value, such as ten or fifteen pounds per square inch, the force on the piston 108 is sufficient to overcome spring 122 and effect unseating of the piston 108 from the annular gasket in the end plate 106. The fluid under pressure in the chamber 123 is thus suddenly active over the entire outer face of the piston in contrast to the smaller inner-seated area of the piston. This results in a sudden increase in the total force exerted by the fluid pressure in chamber 123 on the outer face of the piston 108 and causes the piston assembly to be shifted by snap-action in the right-hand direction to a position determined by the engagement of the end of the stem 115 with a boss 126 on the inner face of the end plate 107. Dashpot action of the piston 110 is prevented by providing an atmospheric port 127 in the end plate 107.

In the right-hand position of the piston assembly just described, the cavity 125 in the slide valve is in such a position that the communication between the ports 49a and 92a is closed while the port 49a is connected by the cavity 125 to a port 100a in the slide valve seat to which the pipe 100 from the brake vent valve 6 is connected. The slide valve 118 is thus positioned to connect the pilot valve pipe 49 to the pipe 100 and the connected piston chamber of the brake vent valve 6, thereby enabling operation of the brake vent valve under the control of the wheel-slip detecting device 4.

The selector valves 8 and 9 are provided for automatically rendering the throttle vent valve 5 operative to control either the forward throttle actuator 2 or the reverse throttle actuator 3, dependent upon the operation of the controller handle 23 in the forward throttle control zone or the reverse throttle control zone.

Both of the selector valves 8 and 9 are identical in construction and a description of one will suffice for both. Each selector valve comprises a suitable casing 128 generally cylindrical in form and having the two open ends thereof closed by end plates 129 and 130 respectively, which are removably attachable to the casing 128 as by screws or bolts (not shown).

Contained in the casing 128 is a piston assembly comprising two pistons 131 and 132 of equal area, the pistons operating in coaxial bores 133 and 134 respectively located at opposite ends of the casing 128. The two pistons are connected by a stem 135 with which one of the pistons, such as the piston 131, is integrally formed, the other piston 132 being suitably secured to the end of the stem 135 opposite the piston 131, as by a screw-threaded connection, in the manner shown in Figure 1.

Formed on the casing 128 between the pistons 131 and 132 is an annular shoulder 136 having a central bore 137 through which the piston stem 135 extends.

Secured to each of the opposite faces of the annular shoulder 136 in concentric relation to the stem 135 is an annular gasket 138. The pistons 131 and 132 are severally provided with an annular rib 139 adapted to seat alternatively on the corresponding gasket 138 in sealing contact, depending upon the direction in which the piston assembly is shifted, it being understood that the piston stem 135 is of such length that when one of the pistons is seated on the corresponding gasket seat 138 the other piston is unseated therefrom, and vice versa.

Fluid under pressure may be supplied alternatively to piston chambers 140 and 141, formed at the outer face of the pistons 131 and 132 of both selector valves 8 and 9, respectively, through pipes 142 and 143 under circumstances hereinafter more fully described. As shown, the chambers 140 of selector valves 8 and 9 are connected to pipe 142 by branch pipes 142a and 142b, respectively. Similarly, the chambers 141 of selector valves 8 and 9 are connected to pipe 143 by branch pipes 143a and 143b respectively.

Selector valve 8 is provided with a port or passage 77a, open to the bore 137 in the annular shoulder 136, to which the pipe 77 leading from the throttle vent valve 5 is connected. Selector valve 9 is provided with a similar port or passage 74a, to which the pipe 74 leading from the throttle vent valve 5 is connected.

Opening into the bores 133 and 134 at a point between each of the pistons 131 and 132 and the annular shoulder 136 are ports 144 and 145, respectively. Connected to the port 144 of selector valve 8 is a pipe 146 leading to the cut-out cock 10. Connected to the port 145 of selector valve 8 is a pipe 147 leading to the cut-out cock 11.

The port 144 of the selector valve 9 is connected by a pipe 148 to the end of the double check valve 36 opposite to that to which the forward release pipe 35 is connected. The port 145 of the selector valve 9 is connected by a pipe 149 to the end of the double check valve 43 opposite to that to which the reverse release pipe 42 is connected.

The pipe 143a, connected to the piston chamber 141 of the selector valve 8, is also connected to one end of the double check valve 76. The pipe 142a is connected by a branch pipe 150 to the opposite end of the double check valve 76.

The cut-out cocks 10 and 11 are identical in construction, each having a casing in which a tapered bore is formed for receiving a tapered valve element 151 of the plug type. Sealing contact of the valve element 151 in the valve bore is maintained by a coil spring 152 interposed between the wide end of the valve element and a screw plug 153 that closes the open end of the bore through which the valve element is inserted. An operating handle 154, fixed to the exteriorly projecting narrow end of the valve element is provided for turning the valve element into either of two positions.

Each valve element 151 contains two through ports 155 and 156 that extend in substantially spaced parallel relation diametrically through the valve element. Each valve element 151 is also provided with a third port 157 extending at right angles to the ports 155 and 156 diametrically through the valve element.

A plurality of ports and passages opening into the tapered valve bore for cooperative registration with the ports 155, 156 and 157 are provided, which passages lead to corresponding ports opening at the exterior of the casing, to which the pipes 33, 34, 146 and 143 are respectively connected in the case of the cut-out cock 10, and to which the pipes 40, 41, 147 and 142 are respectively connected in the case of the cut-out cock 11.

With the handle 154 of the cut-out cock 10 in the position shown in Figure 1, port 155 establishes communication between the pipe 33 and the pipe 143 and the port 156 establishes communication between the pipes 146 and the pipe 34.

When the handle 154 of the cut-out cock 10 is turned substantially 90 degrees out of the position in which it is shown, the connections established by the ports 155 and 156 are cut off and the port 157 establishes a direct communication between the pipes 33 and 34.

Similarly, with the handle 154 of the cut-out cock 11 in the position in which it is shown in Figure 1, the port 155 connects pipe 40 to the pipe 142 and the port 156 connects the pipe 147 to the pipe 41.

When the handle 154 of the cut-out cock 11 is turned substantially 90 degrees out of the position in which it is shown, the connections established by the ports 155 and 156 are cut-off and the port 157 establishes a direct communication from the pipe 40 to the pipe 41.

The cut-out cocks 10 and 11 are normally conditioned as shown in Figure 1 and are operated to positions in quadrature to that shown in Figure 1 only when it is desired to cut the throttle vent valve 5 out of operation and render it ineffective to control the operation of the forward throttle actuator 2 and the reverse throttle actuator 3 respectively.

The check valve 12 is connected in by-passing relation to the cut-out cock 10 in such a manner as to prevent the flow of fluid under pressure therethrough from the pipe 33 to the pipe 34 while permitting rapid reverse flow of fluid therethrough from the pipe 34 to the pipe 33.

Similarly, check valve 13 is connected in by-passing relation to the cut-out cock 11 so as to prevent the flow of fluid therethrough from the pipe 40 to pipe 41 while permitting the rapid reverse flow of fluid therethrough from the pipe 41 to the pipe 40.

The brake valve 15 may be of any suitable type. For the purpose of illustration, the brake valve may comprise a self-lapping portion for supplying fluid under pressure from the supply pipe 19 to the control pipe 16 in a well-known manner and a sanding valve 158 for effecting a manual sanding operation. The brake valve 15 further comprises a handle 159 disposed for rotation in a horizontal plane out of a brake release position, in which the control pipe 16 is vented to the atmosphere through an exhaust port 160, into an application zone in which fluid under pressure is supplied from supply pipe 19 to the control pipe 16 to establish a pressure therein in accordance with the amount of movement of the handle 159 out of said release position.

The handle 159 is secured to a rotatable shaft for operating the self-lapping portion by a pivotal or loose connection which permits said handle to be depressed vertically in any position thereof. A sanding bail 161 engaged by the handle, when depressed contacts a stem 162 of the sanding valve 158 to unseat it and cause flow of fluid under pressure past the valve from the supply pipe 19 to a manual sanding control pipe 163 leading to the brake and sanding control valve mechanism 20 to effect manual sanding in a manner more fully hereinafter described. As will be made apparent hereinafter, the arrangement provided is such that manual sanding will continue so long as the brake valve handle 159 is held in a depressed position, the sanding operation being terminated whenever the handle 159 is restored to its horizontal position. It will be understood that fluid under pressure in the supply pipe 19 present in a chamber 164 beneath the sanding valve 158 urges the valve to seated or closed position to cut off the flow of fluid under pressure to the manual sanding control pipe 163, when the pressure of the handle on the bail is removed. A chamber 166, to which the pipe 163 is connected, is vented at all times to atmosphere through restricted port 165. The port 165 is so restricted that when fluid under pressure is supplied to the pipe 163 the escape of fluid under pressure through the port produces an audible "sizzle" without appreciably reducing the pressure of fluid under pressure supplied to the pipe 163. The port 165 also serves to vent fluid under pressure from the pipe 163 whenever the valve 158 is reseated.

The brake and sanding control valve mechanism 20 comprises a sectionalized casing having five sections 167, 168, 169, 170 and 171 fastened together in any suitable manner (not shown) and embodying therein a valve mechanism comprising two coaxially related valve members 172 and 173 operable by fluid pressure forces exerted alternatively on either of two diaphragms 174 and 175 through an arrangement comprising two pivoted levers 176 and 177.

Considering the brake and sanding control valve mechanism 20 in greater detail, the two diaphragms 174 and 175 are suitably secured in the casing section 167 as by two clamping covers 178 and 179, respectively, attached to said casing section in any suitable manner (not shown).

Two chambers 180 and 181 are formed at opposite sides of the diaphragm 174. Chamber 180 is charged with fluid under pressure alternatively, from pipes 142 and 143 by means of a connection including a double check valve 182, to the opposite inlet ports of which the pipes 142 and 143 are connected, and a pipe 183 connecting the outlet port of the double check valve to the chamber 180.

The pilot valve pipe 49 is connected to chamber 181 through a short branch pipe 49b and chamber 181 is thus charged with fluid under pressure whenever the pipe 49 is charged.

When a differential in the pressure in the two chambers 180 and 181 occurs, due to a reduction of pressure in chamber 181 in response to the operation of wheel-slip detecting device 4 as hereinafter described, a fluid pressure force is exerted on the diaphragm 174 to shift downwardly a slidable plunger 184 having a follower head in contact with the diaphragm.

The lower end of plunger 184 extends into a chamber 186 formed in the casing section 167 and engages one end of the lever 176 which is pivotally supported at its opposite end as by a pin 187 secured in a clevised lug 188 formed or atached to the casing section 168. The downward movement of the plunger 184 is thus effective to rock the lever 176 in a counterclockwise direction about the pin 187 to effect operation of the valve members 172 and 173 in the manner more fully described hereinafter.

Two chambers 189 and 190 are formed at the opposite sides respectively of the diaphragm 175. The chamber 189 is connected to and charged with fluid under pressure from the control pipe 16 through a branch pipe 191.

A chamber 192 is formed in the casing section 167 beneath the chamber 190 and is connected to the latter by a bore 193. Disposed in the bore 193 is a plunger 194 having a follower head in contact with the diaphragm 175 and a valve 195 formed on said plunger for controlling communication between the chambers 190 and 192. The plunger 194 is fluted for a portion of its length adjacent to the valve 195 to permit flow of fluid under pressure between chambers 192 and 190 when said valve is unseated.

The pilot valve pipe 49 is connected to the chamber 192 through a branch pipe 49c. Chambers 192 and 190 are thus charged with fluid under pressure whenever the pipe 49 is charged.

When a differential in the fluid pressure in the two chambers 189 and 190 occurs due to a reduction of pressure in chambers 190 and 192 in response to the operation of the wheel-slip detecting device 4 as hereinafter described, a fluid pressure force is exerted on the diaphragm 175 to shift downwardly the plunger 194 to seat the valve 195 on a seat 196 to close communication between the chambers 190 and 192.

In order to prevent undesired downward movement of the plungers 184 and 194, when fluid under pressure is initially supplied to charge the chambers associated with diaphragms 174 and 175, chokes 185 and 197 are respectively provided in the clamping covers 178 and 179 through which fluid under pressure is supplied to the chambers 180 and 189 from the pipes 183 and 191. The chokes 185 and 197 delay rate of flow of fluid under pressure to chambers 180 and 189 sufficiently with respect to the rate of flow of fluid under pressure to the chambers 181, 190 and 192 as to prevent the build-up of a differential pressure on the diaphragms sufficient to actuate the plungers 184 and 194 downwardly.

The lower end of plunger 194 extends into the chamber 186 and engages one end of the lever 177 which is bifurcated and pivotally supported at each of its two opposite ends as by two coaxially disposed pins 198 and 199 secured in two clevised lugs 200 and 201 formed or attached to the casing section 168. The downward movement of plunger 194 is thus effective to rock the lever 177 in a clockwise direction about the pins 198 and 199 to effect downward movement of the valve members 172 and 173.

Considering the valve member 172 in greater detail, the said valve members is cylindrical in form, having a valve 202 formed at the end thereof and a valve 203 formed intermediate its ends.

Associated with valve member 172 are a plurality of chambers 204, 205, 206 and 207, embodied in the casing sections 168 and 169, which occupy spaced positions axially along the valve member. The valve member 172 is slidable in a suitable bore 208 that extends through the casing walls separating the chambers 204, 205, 206 and 207.

A plurality of grommet rings are suitably disposed in surrounding relation to the valve member 172, as shown, to prevent the leakage of fluid under pressure along said valve member between the various chambers mentioned.

The upper portion of valve member 172 extends through a bore 209 provided in a bushing 210 press-fitted into a bore 211 in the casing section 168 and has a collar 212 formed near its upper end. Formed at the upper end of valve member 172 is a rounded surface 213, corresponding in contour to the chorded section of a cylinder, on which the levers 176 and 177 are supported. A spring 214 is disposed between the collar 212 and a collar 215, formed on a plug 216 having a screw-threaded engagement with the bushing 210, for yieldingly urging the levers 176 and 177 into the position as shown in the drawing. When either of the levers 176 and 177 is rocked downwardly in response to a fluid pressure force on the corresponding diaphragm 174 or 175, the valve member 172 is moved downwardly to a position in which the valves 202 and 203 are seated on respectively associated seats for a purpose which will be subsequently described.

Formed on the lower end of valve member 172 is a fluted portion 217 which slidably engages within a bore 218 extending longitudinally through the valve member 173. The valve 202 seats on a cooperating valve seat formed on the upper end of the valve member 173 surrounding the bore 218. As will be more fully explained hereinafter, the valve member 173 is also slidably shifted downward together with the valve member 172 following the seating of the valve 202.

The valve 202 controls communication between the chamber 207, which is supplied with fluid under pressure from the supply pipe 19 through a branch pipe 219, and a chamber 220 formed in the casing section 171 at the lower end of valve member 173. A pipe 221 leads from the chamber 220 to the speed controlled device 22 and has two branches 221a and 221b that lead, respectively, to a braking compartment 222 and a sanding compartment 223 of the reservoir 21. Check valves 224 and 225 are provided in the branch pipes 221a and 221b, respectively, to prevent back flow of fluid under pressure from the compartments 222 and 223 to the pipe 221. The speed controlled valve device 22 is interposed between pipe 221 and a branch 226 of pipe 221b in bypassing relation to the check valve 225 to permit flow of fluid under pressure from the sanding compartment 223 to effect a sanding operation in a manner more fully hereinafter described.

The valve 203 is effective, when unseated, to establish communication between the chamber 204, to which the brake cylinder 14 is connected through a pipe 227 to one inlet port of the double check valve 103 and pipe 104 leading from the outlet port of said check valve to said cylinder, and the chamber 205, which is open to atmosphere through an exhaust port 228. It will thus be apparent that when the valve 203 is unseated fluid under pressure is exhausted from the brake cylinder 14, and that when valve 203 is seated such exhaust of fluid under pressure is cut off.

Considering the valve member 173 in greater detail, said valve member is cylindrical in form and, for convenience of assembly, comprises two portions secured together as by a screw-threaded connection in the manner shown. A poppet type valve 229 is formed on the upper portion and a similar valve 230 is formed on the lower portion.

Valve 229 is contained in a chamber 231 and valve 230 is contained in the chamber 220. The valve member 173 is slidable in a suitable bore 232 in the casings extending through the casing walls separating the chambers 207, 231, and 220.

A plurality of grommet rings contained in annular grooves spaced axially along the valve member 173 as shown, serve to provide a seal against leakage of fluid under pressure along said valve member between the various chambers mentioned.

The valves 229 and 230 are each yieldingly urged into seated relation on a corresponding seat by a spring 233 that acts on the lower end of valve member 173.

The valve 229 is effective, when unseated, to establish a communication through which fluid under pressure is supplied from the chamber 231 to the chamber 206 by way of bore 232 and a passage 234 connecting the bore 232 to the chamber 206. The chamber 231 is connected to and supplied with fluid under pressure from the braking compartment 222 of the reservoir 21 through a branch 235 of pipe 221a.

A pressure limiting device, illustrated as a spring-loaded ball-type check valve 236, controls communication between the chamber 206 and a chamber 237 that is, in turn, connected by a pipe 245 to pipe 227 leading to the brake cylinder 14. A one-way valve 246 is interposed in pipe 245 to prevent back flow through pipe 245 from the brake cylinder. The ball valve 236 has a stem 238 secured thereto, as by a screw connection, which stem extends through a bore 239 formed in a bushing 240 that is press-fitted into casing section 169. The bushing 240 has a conical seat on which the valve 236 seats to close communication between the chambers 206 and 237.

A diaphragm 241, suitably secured to casing section 169 by a cover 242 having a breather port 243, is suitably connected to the lower end of the stem 238.

A spring 244 interposed between the cover 242 and the diaphragm 241 serves to urge the diaphragm upwardly, and through stem 238, to unseat ball valve 236. The spring 244 is of such a value as to permit the diaphragm 241 to be compressed when the unit fluid pressure in chamber 237 acting on the diaphragm exceeds a certain low value, such as eight pounds per square inch, thus causing the ball valve 236 to be seated and cut off the further flow of fluid under pressure to the brake cylinder. A cut-out valve 247 may be provided in pipe 227, as shown, for preventing the supply of fluid under pressure to the brake cylinder under the control of the brake and sending valve mechanism 20 and thereby cutting out the above described limited brake application, if for any reason this is desired.

The valve 236 controls the supply of fluid under pressure to effect operation of two sanders 248. When unseated, valve 236 establishes communication between the chamber 220 and a pipe and passage 250 leading to one inlet port of a double check valve 251. A pipe 252 having two branches connects the outlet port of the double check valve 251 to the two sanders 248. A cut-out valve 253 may be placed in the pipe 250 between the brake and sanding control valve mechanism 20 and the double check valve 251, as shown, to provide for cutting out the automatic sanding operation effected by the brake and sanding control valve mechanism 20, if for any reason this feature is not desired or required.

Operation of the sanders 248 may be effected under the control of the operator by means of a valve 254 the operation of which is remotely controlled by the brake valve 15. Valve 254 controls communication between a chamber 255, which is in communication with the chamber 220 through a passage 256, and a chamber 257 that is connected by a pipe 258 to the second inlet port of the double check valve 251. The valve 254 has a stem fluted for a portion of its length adjacent to the valve and extending through the chamber 257 and into a chamber 259 disposed beneath the chamber 257 and connected to atmosphere through a port 260. A diaphragm 261, secured to casing section 171 by a cover 263, is subject on one side to atmospheric pressure in the chamber 259 and on the opposite side to pressure in a chamber 262 to which fluid under pressure is supplied under the control of the brake valve 15 through the pipe 163. The diaphragm 261 engages a follower 264 having screw-threaded engagement with the stem of the valve 254 and is operative in response to the pressure of fluid in chamber 262 acting thereon to unseat said valve. Due to the fact that the stem of valve 254 has a close sliding fit in the bore through a wall 265, separating chambers 257 and 259, the pressure of fluid in chamber 257 will not be active on the upper face of the diaphragm 261, especially since such leakage of fluid under pressure as may occur along the stem of valve 254 is immediately vented to atmosphere through port 260. Consequently the valve 254 will be held open whenever fluid under pressure is present in the chamber 262. When fluid under pressure is exhausted from the chamber 262 through the choke 165 of the brake valve 15 when the operator releases the brake valve handle 159, valve 254 will be seated by gravity and by the pressure in the chamber 255 to terminate the flow of fluid under pressure to the sanders 248.

The speed-controlled valve device 22 comprises a casing body 266 having a cover 267 and contains a valve 268 operated by a fly-ball governor device 269 that is suitably supported by a U-shaped bracket or arm 270 formed on or attached to the casing body 266. Two chambers 271 and 272 are formed in the casing body 266. A port 273 connects the two chambers and has a valve seat 274 at the upper end thereof with which the valve 268 cooperates to control communication between the chambers. The upper chamber 272 is connected by the pipe 226 and the branch pipe 221b to the sanding compartment 223 of the reservoir 21, while the pipe 221 is connected to chamber 271. The valve 268 has a stem 275 that extends slidably through a bore 276 in the cover 267 to the exterior of the casing. A collar 277 on the outer end of the stem 275 is engaged by a slidable member 278 of the fly-ball governor device 269 to unseat the valve 268 upwardly in response to a rotation of the fly-ball governor device at a speed exceeding a certain speed. The fly-ball governor device 269 comprises two balls 279 and 280 attached to the outer ends of two arms 281 and 282, the inner ends of which are pivotally attached to a collar 283 secured to a rotary shaft 284. The arms 281 and 282 are connected to the member 278 by two links 285 and 286. The shaft 284 is journaled in the bracket 270 and may be driven from any of the locomotive drive wheel axles (not shown) in any suitable manner.

When the speed of the locomotive exceeds some predetermined low speed, the centrifugal force on the balls 279 and 280 is sufficient to shift the balls outwardly and thereby cause the valve 268 to be unseated upwardly to establish a communication between the sanding compartment 223 of the reservoir 21 and the chamber 220 of the brake and sanding control valve mechanism 20 to permit flow of fluid under pressure from said compartment to the sanders 248 to effect a sanding operation whenever valve 230 is unseated. Whenever the speed of the locomotive is reduced below the above-mentioned predetermined low speed, the centrifugal force on the balls 279 and 280 will be insufficient to maintain the valve 268 unseated against the pressure of the fluid under pressure present in the chamber 272 and said valve will be seated and thereby cut off the flow of fluid under pressure so as to terminate a sanding operation even if valve 230 remains unseated at the time.

OPERATION

(a) Propulsion

With the cut-out cocks 10 and 11 positioned as shown in Figure 1 wherein the throttle vent valve 5 is effective to control the operation of the forward throttle actuator 2 and the reverse throttle actuator 3, and with the brake valve 15 operated to its brake release position so that the pressure in the control pipe 16 is at atmospheric pressure, let it be assumed that the operator desires to start the locomotive in a forward direction by operation of the controller handle 23 out of its "Forward Turbine Engaged" position to some position intermediate the "Forward Throttle Closed" position and the "Forward Full Throttle" position.

In such case, therefore, the controller 1 is effective to cause fluid under pressure to be supplied from the supply pipe 19 to the forward throttle pipe 33. With the cut-out cock 10 in the position in which it is shown in Figure 1, fluid under pressure accordingly flows from the pipe 33 by way of the port 155 in the plug valve element 151 to the pipe 143, from which it is delivered through the branch pipes 143a and 143b to the piston chamber 141 of each of the selector valves 8 and 9. The piston assemblies of the two selector valves 8 and 9 are thus shifted in the lefthand direction from the respective positions in which they are shown to respective positions in which the annular rib 139 on each piston 132 engages the associated annular gasket 138 in seating engagement.

The pressure of the fluid in the branch pipe 143a acts on the valve element of the double check valve 76 to shift it so as to establish a connection from the pipe 143a to the pipe 75, thereby causing fluid under pressure to be supplied to the throttle vent valve 5. As previously described, with the throttle vent valve conditioned as it is shown in Figure 2, fluid under pressure is correspondingly supplied to the piston chamber 89 and, by way of the pipe 92 and the cavity 125 in the slide valve 118 of the transfer valve 7, to the pilot valve pipe 49. It will be understood that, with the control pipe 16 uncharged as it is while the brakes are released, the transfer valve 7 is effective to establish the connection between the pipe 92 and the pilot valve pipe 49.

The chamber 181 of the brake and sanding valve mechanism 20 is also charged with fluid under pressure from the pilot valve pipe 49 through the branch pipe 49b. Chambers 192 and 190 of the valve mechanism 20 are likewise charged with fluid under pressure from pipe 49 through branch pipe 49c.

As previously described, the annular cavity 71 between the pistons 56 and 57 of the piston valve device 52 of the throttle vent valve 5 is at the same time effective to connect the pipe 75 to the pipe 77 so that fluid under pressure is thus supplied from the pipe 75 to the pipe 77, thence through port 77a of the selector valve 8 and past the unseated piston 131, through port 144, pipe 146, port 156 in the valve element 151 of the cut-out cock 10, and pipe 34 to the control valve portion 26 of the forward throttle actuator 2.

With the piston assembly of the selector valve 9 shifted in the left-hand direction to the position in which the piston 132 is in seated engagement with its corresponding gasket seat 138 and the piston 131 is unseated, communication is established between the pipe 148 and the pipe 74. Pipe 74 is connected with the atmospheric exhaust port 73 through the annular cavity 72 between the pistons 55 and 56 of the piston valve device 52 of the throttle vent valve 5. It will thus be seen that no fluid pressure exists in pipe 148 on the valve element of the double check valve 36. Consequently no hindrance is offered to the free movement of the valve element of the double check valve 36 in response to the supply of fluid under pressure to the forward release pipe 35 should the controller handle 23, for any reason, be restored to the "Forward Turbine Engaged" position.

The pressure of the fluid supplied to the pipe 143 also acts on one end of the valve element of the double check valve 182 to shift it to a position such that fluid under pressure is supplied therepast from the pipe 143 to the pipe 183. The fluid under pressure supplied to the pipe 183 flows to the chamber 180 of the brake and sanding valve mechanism 20.

It will be understood that the pressure of the fluid in chamber 180 is built-up concurrently with the build-up of pressure in the chamber 181 beneath the diaphragm 174 but the choke 185 retards the build-up in chamber 180 sufficiently to prevent the creation of an unbalanced force effective to deflect the diaphragm 174 downwardly and cause an undesired operation of the brake and sanding valve mechanism 20 at this time. The diaphragm 174 is thus not operative at this time to shift the valve assembly of the brake and sanding valve mechanism 20 out of the position in which it is shown in Figure 2.

By reason of the supply of fluid under pressure to the control valve portion 26 of the forward throttle actuator 2 in the manner just previously described, the piston 28 and its stem 29 are shifted in the left-hand direction to effect operation of the throttle valve or valves controlling the supply of steam to the forward direction turbine to cause it to turn the driver wheels of the locomotive in a forward direction so that the locomotive is propelled forwardly. Obviously the engineer may shift the controller handle 23 to different positions in the forward throttle zone to provide the desired rate and smoothness of acceleration. After the locomotive has been accelerated to a desired speed, the engineer may also adjust the position of the controller handle 23 in the forward throttle zone to cause desired operation of the throttle valve or valves to vary the speed of the locomotive.

Now let it be assumed that when the engineer operates the controller handle 23 beyond the "Forward Throttle Closed" position toward the "Forward Full Throttle" position, the propulsion torque exerted on the driver wheels of the locomotive is such as to exceed the adhesion between the driver wheels and the track rails, thereby causing spinning of the driver wheels. In such case, therefore, the pilot valve device 47 is operated instantly to effect a rapid reduction of the pressure in the pilot valve pipe 49, thereby effecting a correspondingly rapid reduction of the pressure in the piston chamber 89 of the throttle vent valve 5 and in the chambers 181, 190 and 192 of the brake and sanding valve mechanism 20.

The piston valve device 52 of the throttle vent valve 5 is accordingly operated, in the manner previously described, to cause venting of fluid under pressure from the pipe 77 at a rapid rate through the exhaust port 62, and at the same time to establish communication, through the annular cavity 71, between the pipe 75 and pipe 74. Fluid under pressure is accordingly rapidly vented from the control valve portion 26 of the forward throttle actuator 2 by flow through the pipe 34, port 156, of the cut-out cock 10, pipe 146, through the selector valve 8 to the pipe 77, and thence to atmosphere through the exhaust port 62. At the same time, fluid under pressure is supplied from the pipe 75 to the pipe 74, and thence through the selector valve 9 to the pipe 148 where the pressure of the fluid is effective on the valve element of the double check valve 36 to shift it so as to establish a connection from the pipe 148 to the pipe 37 leading to the forward throttle actuator 2. From previous description it will be recalled that fluid under pressure from the pipe 37 flows to the chamber on the spring side of the piston 28 in the piston portion 25 of the actuator 2, as well as to the release insuring valve device which effects the independent release of fluid under pressure from the pressure chamber 27.

As a result, therefore, the piston 28 of the actuator 2 is promptly and rapidly restored to the position corresponding to that to which it would be restored if the controller handle 23 were restored to the "Forward Turbine Engaged" position, in which the throttle valve cuts off the supply of steam to the forward direction turbine.

Concurrently with the operation of the forward throttle actuator 2 to effect cut off of the supply of steam to the forward direction turbine as just described, the brake and sanding control valve mechanism 20 operates in response to the reduction of the pressure in the chamber 181 to effect, sequentially, the supply of fluid under pressure to the sanders 248, and, at the limited pressure of approximately eight pounds per square inch, to the brake cylinder 14 in a manner which will now be described.

When starting the train, the valve 268 of the speed-controlled valve 22 is closed until the speed of the train reaches some predetermined low speed. When wheel spin occurs prior to reaching this predetermined speed due to excessive propulsion power applied to the driver wheels, a brake and sanding operation will be effected concurrently with the automatic throttle valve operation to cut off the supply of steam to the driving turbine to assist in bringing the driver wheels to rest by reason of the fact that as soon as the adhesion between the driver wheels and the rails is overcome the rotative speed of the driver wheels will increase rapidly, in a very short interval of time, to a rotational speed exceeding the above-mentioned predetermined low speed. As soon as this speed is reached the valve 268 will be opened to permit fluid under pressure from the sanding compartment 223 of the reservoir 21 to flow to the sanders 248 to effect sanding of the rails under the control of the brake and sanding control valve 20.

When fluid under pressure is vented from the chamber 181 by operation of the pilot valve device 47, the fluid under pressure in the chamber 180 acting on the upper face of the diaphragm 174 urges said diaphragm downwardly. The force thus exerted on the diaphragm 174, acting through the diaphragm follower and plunger 184, rocks the operating lever 176 counterclockwise about its fulcrum pin 187, which results in downward movement of the valve member 172 as previously described. The initial downward movement of the valve member 172 seats valve 202 on the seat formed at the upper end of the bore 218 in the valve member 173, thereby cutting off the supply of fluid under pressure to both compartments 222 and 223 of the reservoir 21 from the supply pipe 19 by way of the branch pipe 219. Further downward movement of the valve member 172 causes the valve member 173 to move in unison with it to unseat the valves 229 and 230 from their respective seats. The downward movement of the valve members 172 and 173 is terminated by the valve 203 seating on its seat formed at the upper end of the bore 208, which also closes the exhaust communication from the brake cylinder 14 to atmosphere through the pipe 104, double check valve 103, pipe 227, chamber 204, bore 208, chamber 205 and exhaust port 228.

The valve 230, when unseated causes fluid under pressure to flow from the sanding compartment 223 of the reservoir 21 through branch pipe 221b, pipe 226 to the chamber 272 of the speed-controlled valve device 22, thence past the valve 268, which is unseated as long as the rotative speed of the locomotive driver wheels exceeds the hereinbefore mentioned predetermined low speed, to chamber 271, thence through the pipe 221 to the chamber 220, thence past the open valve 230, through the bore 232, and the passage and pipe 250 to one side of the double check valve 251 and thence through the pipe 252 to the sanders 248 which thus operate to effect sanding of the rails in advance of the locomotive driver wheels.

The valve 229 is effective, when unseated, to cause fluid under pressure to flow from the braking compartment 222 of the reservoir 21 through the branch pipe 221a and the pipe 235 to the chamber 231, thence past the open valve 229 and through bore 232, passage 234, chamber 206, past ball check valve 236 to chamber 237, and thence through pipe 245, past one-way valve 246, to pipe 227 which leads to one side of the double check valve 103, and thence through pipe 104 to brake cylinder 14. The strength of the spring 244 is such that when the pressure in chamber 237 reaches approximately eight pounds per square inch, the diaphragm 241 will be deflected downwardly thereby compressing said spring and carrying with it the stem 238 and the ball check valve 236 which thus seats on its seat and terminates further flow of fluid under pressure to, and consequently further build-up of pressure in, the brake cylinder 14.

As a result of the cut-off of steam to the forward direction turbine, the sanding of the rails, and the light brake application effected on the driver wheels as just described, the spinning of the driver wheels is promptly and rapidly terminated so as to prevent serious wear on the rails and tread surfaces of the driver wheels as well as the wastage of steam.

When the spinning of the driver wheels of the locomotive is terminated and the pilot valve device 47 of the wheel-slip detecting device 4 is consequently restored to its closed position terminating the reduction of the pressure in the pilot valve pipe 49, the throttle vent valve 5 and the brake and sanding control valve mechanism 20 are not necessarily restored instantly to the position in which they are shown in the drawing unless the pressure reduction valve 79 of the throttle vent valve is reseated in response to the reduction of the pressure in the pipe 77 and the connected control valve portion 26 of the forward throttle actuator to below approximately eighteen pounds per square inch.

As previously indicated, the time lag required to build-up sufficient pressure in the piston chamber 89 to effect restoration of the piston valve device 52 downwardly to the position in which it is shown in Figure 2 is such as to cause the reduction of the pressure in the pipe 77 and the connected control valve portion 26 of the forward throttle actuator 2 to continue for a slight interval of time so that the pressure supplied to the control valve portion 26 of the forward throttle actuator 2 actually reduces to some value lower than the eighteen pounds per square inch, such as for example five pounds per square inch.

It will be apparent, therefore, that once operation of the throttle vent valve 5 is initiated, the reduction of the pressure in the control valve portion 26 of the forward throttle actuator 2 continues automatically so as to insure the complete closure of the throttle valve controlling the supply of steam to the forward direction turbine.

Upon the restoration of the piston valve device 52 of the throttle vent valve 5 to the normal position thereof in which it is shown in Figure 2, the annular cavity 71 reestablishes communication through which fluid is supplied from pipe 75 to the pipe 77 and thence to the control valve portion 26 to restore the pressure therein to that corresponding to the position of the controller handle 23, and cavity 72 reestablishes communication between the pipe 74 and the exhaust port 73 to effect the venting of fluid under pressure from the chamber on the spring side of the piston 28 of the actuator 2.

Restoration of the pressure in the chamber 181 in accordance with the restoration of the pressure in the pilot valve pipe 49 equalizes the pressure on the two sides of the diaphragm 174. With the pressure on the two sides of diaphragm 174 equal, the spring 214 acting on the collar 212 of the valve member 172 moves said valve member upwardly, thereby causing clockwise rocking of lever 176 to the position in which it is shown in Figure 2. The initial upward movement of the valve member 172 unseats the valve 203 and permits the spring 233 to move the valve member 173 upward in unison with valve member 172 until the valves 229 and 230 seat on their respective seats to terminate the supply of fluid under pressure from the reservoir 21 to the brake cylinder 14 and the sanders 248. Further upward movement of the valve member 172 lifts the valve 202 from its seat at the upper end of the bore 218 in the valve member 173, thereby restoring the communication through which recharging of the compartments 222 and 223 of the reservoir 21 is promptly effected.

The valve 203 is effective, when unseated, to cause fluid under pressure to be vented to atmosphere from the brake cylinder 14 through the pipe 104, past double check valve 103, through pipe 227, chamber 204, past the open valve 203, through bore 208 to the chamber 205 and through the exhaust port 228, thus effecting a release of the brake application on the driver wheels of the locomotive. At the same time, fluid under pressure is vented from the chamber 237 through the pipe 245, past check valve 246 to the pipe 227 and to the atmosphere as explained above. When fluid under pressure is sufficiently vented from chamber 237 and from the top face of diaphragm 241, the spring 244 moves the diaphragm 241 and the stem 238 upwardly thereby unseating the valve 236 from its seat to permit venting of the fluid under pressure in the chamber 206 along with that in the chamber 237.

It will thus be seen that when spinning of the locomotive driver wheels ceases, the release of the light brake application on the spinning wheels, the termination of sanding of the rails, and a recharge of the compartments of the reservoir 21 is automatically effected.

Whenever the rotative speed of the locomotive driver wheels is reduced below the hereinbefore mentioned predetermined low speed, in response to the cut-off of steam to the forward direction turbine and the light brake application described above, the valve 268 of the speed-controlled device 22 will close to terminate the flow of fluid under pressure from the compartment 223 of the reservoir 21 to the sanders 248 irrespective of whether the pilot valve device 47 has operated to cease venting of the pilot valve pipe 49 to the atmosphere and to restore fluid under pressure to the chamber 181 to permit closing of the valves 229 and 230 of the brake and sanding control valve mechanism 20 in the manner previously described. Thus termination of sanding is effected automatically under the control of the speed-controlled device 22 without regard to the condition of the wheel slip responsive device 4 and the brake and sanding control valve mechanism 20.

If, upon operation of the forward throttle actuator 2 to again open the throttle valve controlling the supply of steam to the forward direction turbine, the driver wheels again begin to spin, the above operation is repeated automatically. Thus, at no time are the driver wheels permitted to spin longer than the operating time elapsing between the response of the wheel slip responsive device 4 to the incipiency of the spinning condition and the closing of the throttle valve. For all practical purposes it may be said that the spinning condition is terminated almost instantaneously upon the occurrence thereof, so that serious wear of the tread surface on the driver wheels due to spinning is prevented.

The above operation of the throttle vent valve 5 has been described in connection with automatic throttle control for the forward direction of travel. However, the throttle vent valve 5 is operative in substantially the same manner to control the operation of the reverse throttle actuator in the event that spinning of the driver wheels occurs during propulsion or initiation of propulsion of the locomotive in the reverse direction. In order to explain more fully the function of the selector valves 8 and 9 in this connection, a brief description of the charging of the equipment will now be given for the operation of the controller handle 23 in the reverse throttle zone.

Let it be assumed that the locomotive is stopped and that the controller handle 23 has been shifted transversely from the "Forward Turbine Engaged" position to the "Reverse Turbine Engaged" position. At this time, fluid at six to eight pounds per square inch is supplied through the reverse throttle pipe 40 to the control valve portion 26 of the reverse throttle actuator 3 by way of the port 155 in the cut-out cock 11, pipe 142, branch pipe 142a, pipe 150 past the valve element of the double check valve 76 which is automatically shifted to establish a connection between the pipe 150 and the pipe 75, thence by way of the pipe 75, cavity 71 of the piston valve device 52 of the throttle vent valve 5, pipe 77, past the unseated piston 132 of the selector valve 8 which is unseated in response to the fluid pressure in the pipe 142a active on the piston 131, pipe 147, port 156 of the cut-out cock 11 and pipe 41 to the control valve portion 26 of actuator 3.

At the same time, fluid under pressure in pipe 142 is transmitted through the branch pipe 142b to act on the piston 131 of the selector valve 9 to shift the piston assembly in the right-hand direction to the position in which it is shown in Figure 1, wherein the piston 132 is unseated. The end of the double check valve 43 opposite to that subject to the pressure of fluid being supplied, under the control of the controller 1, to the reverse release pipe 42 is therefore connected to atmosphere to permit the fluid under pressure from the pipe 42 to be supplied to the pipe 44 and thence to the chamber on the spring side of the piston 28 of the reverse throttle actuator 3. It will be seen that the said end of the double check valve 43 is connected to atmosphere by way of the pipe 149, past the unseated piston 132 of the selector valve 9, port 74a, pipe 74, cavity 72 of the piston valve device 52 of the throttle vent valve 5, and atmospheric exhaust port 73.

At the same time, fluid under pressure in the pipe 142 shifts the valve element of the double check valve 182 to a position establishing a connection from the pipe 142 to the pipe 183 from which fluid under pressure flows to the chamber 180 of the brake and sanding control valve mechanism 20.

The piston chamber 89 of the throttle vent valve 5, the pilot valve pipe 49, and the piston chambers 181, 190 and 192 of the brake and sanding control valve mechanism 20 are charged by flow of fluid under pressure from the pipe 75 in the same manner previously described for operation of the controller 1 in the forward throttle zone.

When the controller handle 23 is shifted to the "Reverse Throttle Closed" position, the pressure of the fluid supplied to the reverse throttle pipe 40 and thence to the control valve portion 26 of the reverse throttle actuator 3 is increased to ten pounds per square inch. At the same time, fluid under pressure is vented to atmosphere from the reverse release pipe 42 and the connected chamber on the spring side of the piston 28 of the actuator 3. As previously indicated, in this position of the controller handle 23, the piston stem 29 of the reverse throttle actuator 3 is moved outwardly sufficiently to open the throttle valve or valves controlling the supply of steam to the reverse turbine sufficiently to supply steam for warming up purposes but insufficient in amount to cause operation of the turbine.

Assuming further that the controller handle 23 is now shifted to a position in the reverse throttle zone between the "Reverse Throttle Closed" position and the "Reverse Full Throttle" position, the pressure of the fluid supplied to the reverse throttle pipe 40 is correspondingly increased to effect a corresponding outward movement in the left-hand direction of the piston stem 29 of the actuator 3. The throttle valve or valves controlling the supply of steam to the reverse direction turbine are thus opened to supply steam in an amount corresponding to the position of the controller handle, thereby causing the reverse direction turbine to exert a propulsion torque on the driver wheels of the locomotive tending to propel it in a reverse direction.

If spinning of the locomotive driver wheels occurs in response to the supply of steam to the reverse direction turbine, the throttle vent valve 5 is operated in response to the reduction of the pressure of fluid in pilot valve pipe 49 by unseating of the pilot valve device 47 of the wheel slip responsive device 4 to effect venting of fluid under pressure from the control valve portion 26 of reverse throttle actuator 3 through the pipe 77 and exhaust port 62 as well as to supply fluid under pressure from the pipe 75 to the pipe 74 leading to the double check valve 43, and thence through the pipe 44 to the chamber on the spring side of the piston 28 of the actuator 3.

The reverse throttle actuator 3 is thus operated in response to operation of the throttle vent valve 5 to cause complete closure of the throttle valve or valves controlling the supply of steam to the reverse direction turbine.

At the same time, the brake and sanding control valve mechanism 20 is operated in response to the reduction of the pressure in the chamber 181 corresponding to the reduction of the pressure in the pilot valve pipe 49, to effect a light application of the brakes on the spinning wheels and a sanding operation in the same manner previously described for operation of the controller handle 23 in the forward throttle zone.

Upon the reclosure of the pilot valve device 47 of the wheel slip responsive device 4 and the reclosing of the pressure reduction valve 79 of throttle vent valve 5 in response to the reduction of the pressure in chamber 83 thereof, the throttle vent valve is promptly restored to a position in which the piston valve device 52 restores those communications, previously described, through which fluid under pressure is supplied to the control valve portion 26 of the throttle actuator 3 and released from the chamber on the spring side of the piston 28 of the actuator 3.

It will be seen that the check valves 12 and 13 function to prevent the supply of fluid under pressure from the forward throttle pipe 33 to the control valve portion 26 of the forward throttle actuator 2 and from the reverse throttle pipe 40 to the control valve portion 26 of reverse throttle actuator 3, respectively, whenever the throttle vent valve 5 is operated to reduce the pressure in the control valve portion 26 of the two actuators. It will be apparent, moreover, that reduction of the pressure in the control valve portion 26 of the two actuators 2 and 3 by operation of the controller 1 remains at all times under the control of the engineer. Thus rapid and prompt reduction of the pressure in the control valve portions 26 of the two actuators 2 and 3 directly through the check valves 12 and 13 is assured independently of the charging communication to the control valve portions 26 controlled by the throttle vent valve 5.

If it is desired, for any reason, such as to repair certain of the devices providing the automatic control of the throttle actuators 2 and 3, such devices may be cut out of operation by turning the operating handle 154 of each of the two cut-out cocks 10 and 11 to a position in quadrature to that in which they are shown. In such position of the valve element 151 of each of the cut-out cocks 10 and 11, communication is established directly through the corresponding port 157 from the forward throttle pipe 33 to the pipe 34 and from the reverse throttle pipe 40 to the pipe 41. In such case, therefore, the actuators 2 and 3 will be operated in the usual manner under the control of the controller 1 as previously described. However, since the pipes 142, 143, 146 and 147 are closed at the corresponding cut-out cocks 10 and 11, it will be seen that no fluid under pressure will be supplied to the pipe 75 and consequently the piston chamber 89 of the throttle vent valve 5, the pilot valve pipe 49, and the chambers 181, 190 and 192 of the brake and sanding control valve mechanism 20 will remain uncharged. The springs 214 and 233 will maintain the valve members 172 and 173 of the brake and sanding control valve mechanism 20 in the positions in which they are shown in Figure 2, and should spinning of the driver wheels occur, unseating of the pilot valve device 47 of the wheel slip responsive device 4 will be without operative effect.

If for any reason it is desired to cause the brake and sanding control valve mechanism 20 to effect only a light brake application and no sanding operation, the cut-out valve 253 may be closed manually to prevent the supply of fluid under pressure to the sanders 248 upon the operation of the brake and sanding control valve mechanism 20.

It should be noted at this point, however, that manual sanding may be obtained in the usual way, even though valve 253 is closed, since upon manually depressing the handle 159 of the brake valve 15 upon the sanding bail 161, fluid under pressure will be supplied to the pipe 163 and the chamber 262 under the control of the sanding valve 158 as previously described. Fluid under pressure in the chamber 262 urges the diaphragm 261 upwardly and thereby unseats valve 254 from its seat to cause fluid under pressure to flow from the sanding compartment 223 to the pipe 258 and thence to pipe 252 past the valve element of the double check valve 251 which is automatically shifted to establish a connection between the pipe 258 and the pipe 252, thereby permitting fluid under pressure to flow to the sanders 248 to effect sanding of the rails.

If it is desired that the brake and sanding valve mechanism 20 operate to cause only a sanding operation, the cut-out valve 247 interposed in the pipe 227 through which fluid under pressure is supplied to the brake cylinder 14 may be closed manually to prevent the supply of fluid under pressure to the brake cylinder.

If it is desired for any reason to eliminate both functions of the brake and sanding control valve mechanism 20, then both valves 253 and 247 may be closed.

(b) *Brake operation*

Now let it be supposed that, while the locomotive is traveling along the road under propulsion power, the operator or engineer desires to initiate a brake application to bring the locomotive or train to a stop. To do so, he first restores the controller handle 23 from the position in the forward throttle zone or reverse throttle zone to the "Forward Turbine Engaged" or "Reverse Turbine Engaged" position, depending upon the operating zone in which the controller handle happens to be. The corresponding throttle actuator 2 or 3 is accordingly operated to close the throttle valve or valves controlling the supply of steam to the forward direction turbine or to the reverse direction turbine.

Following such operation of the controller 1, the operator or engineer then shifts the handle 159 of the brake valve 15 out of its brake release position into its application zone an amount corresponding to the desired degree of brake application.

The control pipe 16 is accordingly charged to a pressure corresponding to the position of the brake valve handle in its application zone such as, for example, fifty pounds per square inch. Upon the charging of the control pipe 16 as just described, the corresponding fluid pressure established in the piston chamber 123 of the transfer valve 7 acts on the piston 108 to shift the piston assembly in the right-hand direction to the position in which the cavity 125 of slide valve 118 connects the pilot pipe 49 to the pipe 100 leading to the brake vent valve 6 and cuts off the connection between the pilot valve pipe 49 and pipe 92 leading to the throttle vent valve 5.

At the same time, the chamber 189 of the brake and sanding control valve mechanism 20 is charged with fluid under pressure from the control pipe 16 by way of the branch pipe 191. By reason of the fact that the chambers 190 and 192 of the brake and sanding control valve mechanism 20 are being simultaneously built-up in accordance with the build-up of pressure in the pilot valve pipe 49 through the communication extending from the control pipe 16 by way of pipe 101, brake vent valve 6, pipe 100, and cavity 125 in the slide valve 118 of the transfer valve 7, it will be seen that the diaphragm 175 and the valve assembly of the brake and sanding control valve mechanism 20 remain in the position shown. The choke 197 so restricts the rate at which the chamber 189 is charged relative to that at which the chambers 190 and 192 are charged, as to prevent a sufficient unbalanced force being developed to act on the diaphragm 175 to effect undesired operation of the valve mechanism 20 at this time.

Fluid under pressure flows from the control pipe 16 by way of the pipe 101, and a communication established through the brake vent valve 6 to the pipe 102, past the double check valve 103, and pipe 104 to the brake cylinder 14 so that the pressure established in the brake cylinder corresponds to that established in the control pipe 16. The brakes are accordingly applied on the driver wheels of the locomotive to a degree corresponding to the pressure established in the control pipe 16.

So long as the degree of the brake application exerted on the driver wheels of the locomotive is ineffective to cause a slipping of the driver wheels, no variation in the pressure of the fluid in the brake cylinder 14 occurs except in response to variation of the pressure in the control pipe 16 under the control of the engineer.

If, however, due to the brake application effected on the driver wheels of the locomotive, a slipping condition thereof is induced, the pilot valve device 47 of the wheel slip responsive device 4 is unseated to effect a rapid reduction of the pressure in the pilot valve pipe 49. The brake vent valve 6 is accordingly promptly operated by the venting of fluid under pressure from pipe 100 through cavity 125 of slide valve 118 of transfer valve 7 and pipe 49 to cut off the supply of fluid under pressure from the control pipe 16 to the brake cylinder 14 and to establish a communication through which fluid under pressure is rapidly vented from the brake cylinder 14 through the pipe 104, double check valve 103, pipe 102 and an exhaust port (not shown) at the vent valve. The slipping wheels promptly cease to decelerate and accelerate back to a speed corresponding to locomotive speed due to the reduction in brake cylinder pressure effected as just described. This reduction of the pressure in the brake cylinder 14 continues automatically, notwithstanding the reseating or reclosing of the pilot valve device 47 of the wheel slip responsive device 4 at the time the slipping wheels are restored substantially to locomotive speed, until such time as the pressure in the brake cylinder 14 reduces to a low value, such as five pounds per square inch. At such time, the brake vent valve 6 is automatically restored to the condition terminating the further reduction of the pressure in the brake cylinder and establishing the communication through which fluid under pressure is again supplied from the control pipe 16 to the brake cylinder to effect reapplication of the brakes on the driver wheels of the locomotive.

Should the driver wheels of the locomotive again begin to slip upon reapplication of the brakes, the pilot valve 47 is again unseated to effect a rapid reduction of the pressure in the pilot valve pipe 49 and a consequent operation of the brake vent valve 6 to reduce the degree of brake application to a low value and then restore the brake application to a degree corresponding to the pressure established in the control pipe 16.

At no time, therefore, are the wheels permitted to become locked and slide.

It will be apparent that at the time that the brake vent valve 6 is operated to reduce the degree of application of the brakes in response to the operation of the wheel slip responsive device 4, the brake and sanding control valve mechanism 20 is also operated in response to the reduction of the pressure in the chambers 190 and 192 thereof in correspondence with the reduction of the pressure in the pilot valve pipe 49 to cause fluid under pressure to be supplied from the sanding compartment 223 of the reservoir 21 to the pipe 252 leading to the sanders 248, in the manner previously described. Thus sanding of the rails is effected concurrently with the reduction of pressure in the brake cylinder to assist in terminating the slipping condition of the driver wheels.

At the same time that fluid under pressure is supplied to the sanders 248, fluid under pressure is also supplied from the braking compartment 222 to the pipe 227 but since a brake application is already in effect which will be in excess of eight pounds per square inch, the pressure in the pipe 227 will be ineffective to shift the valve element of the double check valve 103 in opposition to the higher fluid pressure being supplied to the brake cylinder by way of the brake vent valve 6.

When fluid under pressure is vented from the chambers 190 and 192 of the brake and sanding control valve mechanism 20 in response to the operation of the wheel slip responsive device 4, the unreduced control pipe pressure present in the chamber 189 above the diaphragm 175 urges said diaphragm downwardly to shift valve 195 into seating engagement with its seat 196. Since the area of the diaphragm 175 is greater than the area of the valve 195 subject to the fluid pressure in the chamber 192 the restoration of pressure in chamber 192 upon the closing of the pilot valve 47 in response to a cessation of wheel slip, is ineffective to unseat the valve 195. Thus, with the valve 195 maintained seated by the fluid pressure acting on diaphragm 175 in chamber 189, fluid under pressure cannot flow to the chamber 190 and thus equalize the fluid pressure on the diaphragm 175 because the force tending to maintain the valve 195 seated exceeds the force tending to open it. Therefore, the brake and sanding control valve mechanism 20 will be maintained in an operative position wherein sanding of the rails continues until either the brake application is released by reduction of the pressure in the control pipe 16 to atmospheric pressure or the fluid under pressure in the sanding compartment 223 of the reservoir 21 is blown down to atmospheric pressure, or the speed of the train is reduced to some predetermined speed. The continuation of sanding, as long as the brake application is in effect tends to prevent a recurrence of wheel slip because of the improved adhesion between the locomotive driver wheels and the rails resulting from sanding.

When the locomotive or train comes to a stop in response to a brake application as described above, the brakes will remain applied according to the pressure established in the brake cylinder 14 in correspondence with the pressure of the fluid established in the control pipe 16.

It will be apparent that the engineer may reduce the pressure in the control pipe 16, from that originally established, as the locomotive and train reduce in speed in approaching a stop to effect a corresponding reduction in the degree of application of the brakes on the driver wheels of the locomotive and on the cars of the train. Also, after the locomotive or train has come to a stop, the engineer may increase the pressure in the control pipe 16 to effect a corresponding increase in the degree of brake application, if desired for any reason, such as to insure holding the locomotive and train against creepage on a grade.

When the engineer again desires to start the locomotive or train, he will of course first release the brakes by restoring the brake valve handle 159 to brake release position to reduce the pressure in the control pipe 16 to atmospheric pressure. The fluid under pressure in the brake cylinder 14 will thus be vented to atmosphere by flow back through the brake vent valve 6 to the control pipe 16 and thence to atmosphere through the exhaust port 160 of the brake valve 15.

When the brakes are released by moving the brake valve handle 159 of the brake valve 15 to release position, fluid under pressure will be vented from the chamber 189 by way of the pipe 191 and the control pipe 16 through the exhaust port 160 in the brake valve 15. As the pressure of fluid in the chamber 189 of the brake and sanding control valve mechanism 20 reduces, the pressure in the chamber 192 acting on the lower side of the valve 195 becomes sufficient to raise said valve from its seat 196, thus causing fluid under pressure to flow from the chamber 192 to the chamber 190 and quickly equalize the fluid pressure on both sides of the diaphragm 175. When the valve 195 is moved upwardly, the plunger 194 moves upwardly with the valve thus allowing the spring 233 to seat the valves 229 and 230 on their respective seats to terminate the sanding operation, and allowing the spring 214 to unseat the valves 202 and 203 from their respective seats to cause recharging of the compartments 222 and 223 of the reservoir 21.

Recharging of the reservoir 21 after the brake application has been released and prior to again starting the train thus insures an adequate supply of fluid under pressure to provide for a sanding and brake application if a wheel spin occurs due to an excess of propulsion power supplied to the driver wheels when the train is again started and before it has reached some predetermined speed.

SUMMARY

It will be seen from the above description that I have provided in a locomotive propulsion and brake control system an arrangement including a brake and sanding control valve mechanism which is operative in response to a spinning condition of the driver wheels resulting from the application of excessive propulsion power thereto, to effect a sanding of the rails and a light brake application concurrently with cut off of steam to the driving turbines of the locomotive to assist in promptly terminating the spinning condition. The above mentioned arrangement is further effective during a brake application, upon the slipping of the driver wheels resulting from the application of excessive braking power thereto, to effect sanding of the rails and to continue such sanding notwithstanding cessation of wheel slip, until the brake application is released, or until the rotative speed of the driver wheels reduces below some predetermined value, or until the available fluid pressure is depleted. By providing for a continuation of sanding after wheel slip has ceased, the adhesion between the driver wheels and the rails is improved and the likelihood of a recurrence of wheel slip is minimized during the remainder of the time that the brake application is in effect.

In order to prevent the undesired waste of sand due to a sanding operation continued after the train comes to a stop, the arrangement provided functions automatically to terminate the sanding operation in any event immediately prior to the stopping of the train.

Having now described my invention, what I claim as new and desire to secure by Letters Patent, is:

1. A control apparatus comprising, in combination, two fluid pressure responsive means each having a first chamber at one side and a second chamber at the opposite side thereof, valve means operative under the control of either one of said fluid pressure responsive means to effect a desired control operation, a first fluid pressure control means operative at one time to establish a fluid pressure force acting on one of said fluid pressure responsive means in the corresponding said first chamber, a second fluid pressure control means operative at another time to establish a fluid pressure force acting on the other of said fluid pressure responsive means in the corresponding said first chamber, operator's control means for causing each of said second chambers to be charged to a pressure substantially equal to that in either of said first chambers, and wheel slip responsive means operative to vary simultaneously the fluid pressure forces acting in said second chambers to cause operation of the said one fluid pressure responsive means at said one time and to cause operation of the said other fluid pressure responsive means at said other time.

2. In a sanding control apparatus for a vehicle having driver wheels, the combination with braking means for effecting a brake application on the driver wheels, a rail sanding device associated with said driver wheels, and a source of supply of fluid under pressure, of a reservoir chargeable with fluid under pressure from said source of supply, sanding control valve means operative to cause fluid under pressure to be supplied from said reservoir to said sanding device to effect sanding, fluid pressure responsive means for operating said valve means, said fluid pressure responsive means having a first chamber at one side and a second chamber at the opposite side thereof, brake control means for effecting operation of said braking means and for also establishing substantially equal pressures in both of said chambers, and wheel slip detecting means operatively responsive to slipping of the driver wheels of the vehicle while a brake application is in effect for effecting a reduction of pressure in one of said chambers whereby to cause the fluid pressure in the other of said chambers to be effective upon said fluid pressure responsive means to operate said valve means to establish a communication from said reservoir to cause sanding.

3. In a sanding control apparatus for a vehicle having driver wheels, the combination with braking means for effecting a brake application on the driver wheels and a source of supply of fluid under pressure, of a reservoir chargeable with fluid under pressure from said source of supply, sanding control means operative to cause fluid under pressure to be supplied from said reservoir to effect sanding, fluid pressure responsive means for operating said control means, said fluid pressure responsive means having a first chamber at one side and a second chamber at the opposite side thereof, brake control means for effecting operation of said braking means and at the same time establishing substantially equal pressures in both of said chambers, pressure reducing means for effecting a reduction of the fluid pressure in said second chamber to render the fluid pressure in said first chamber effective on the fluid pressure responsive means to effect operation of said control means, and valve means effective when said fluid pressure responsive means operates said control means to thereafter prevent restoration of pressure in said second chamber to a pressure equal to that in the first chamber so long as a certain pressure remains in said first chamber, thereby to cause the fluid pressure responsive means to maintain the said valve means continuously in its sanding position.

4. In a brake and sanding control apparatus for a vehicle having driver wheels, in combination, braking means for effecting a brake application on said driver wheels, a source of supply of fluid under pressure, a reservoir chargeable with fluid under pressure from said source of supply, valve means operative to cause fluid under pressure to be supplied from said reservoir to effect a sanding operation, fluid pressure responsive means for operating said valve means, said fluid pressure responsive means having a first chamber at one side, a second chamber at the opposite side and a third chamber having a normally open communication with said second chamber, brake control means for effecting operation of said braking means and at the same time establishing substantially equal pressures in all three of said chambers, a valve device controlling said communication, and wheel slip detecting means responsive to slipping of the driver wheels of the vehicle during a brake application for effecting a reduction of pressure in said second and said third chambers whereby to cause the fluid pressure force in said first chamber to be effective upon said fluid responsive means to operate said valve means to establish a communication from said reservoir to cause sanding and to also operate said valve device to close the communication between said second and said third chambers so long as said brake application is in effect.

5. A brake and sanding control apparatus for a vehicle having driver wheels, propulsion means for applying propulsion power to said wheels, and braking means for effecting a brake application on said wheels, comprising, in combination two fluid pressure responsive means each having a first chamber at one side and a second chamber at the opposite side thereof, operator's propulsion control means for charging one of said first chambers during propulsion of said vehicle, operator's brake control means for charging the other of said first chambers during a brake application on the driver wheels of said vehicle, transfer means controlled by one of said operator's control means for causing each of said second chambers to be charged to a pressure substantially equal to that in either of said first chambers, wheel-slip responsive means for controlling the pressure in said second chambers to cause operation of one of said fluid pressure responsive means during propulsion and to cause operation of the other of said fluid pressure responsive means during a brake application, and valve means operable in response to the operation of said one fluid pressure responsive means during propulsion to cause operation of said braking means and to also cause a sanding operation and operable in response to the operation of said other fluid pressure responsive means during a brake application to cause a sanding operation only.

6. In a vehicle brake and sanding control apparatus, in combination, two reservoirs, a braking and sanding control valve mechanism operative at one time to effect charging of said reservoirs with fluid under pressure and operative at another time to control the supply of fluid under pressure from one of said reservoirs to effect a sanding operation and to control the supply of fluid under pressure from the other of said reservoirs to effect a brake application on the driver wheels of a vehicle, and valve means operatively responsive to the speed of the vehicle driver wheels and effective to prevent the supply of fluid under pressure from said one reservoir to effect sanding when the speed of the vehicle driver wheels reduces below a certain low value thereby to terminate sanding notwithstanding said braking and sanding control valve mechanism being operatively conditioned to cause sanding.

7. In a sanding control apparatus for a vehicle having driver wheels, the combination of a reservoir, valve mechanism operatively controlling supply of fluid under pressure to charge said reservoir and supply of fluid under pressure from said reservoir to effect a sanding operation, valve means controlling communication through which fluid under pressure is supplied by said mechanism from said reservoir to effect sanding, and means responsive to rotational speed of the driver wheels of the vehicle for actuating said valve means to open said communication above a chosen speed of said wheels and to close said communication below said chosen speed.

8. In a sanding control apparatus for a vehicle having driver wheels, the combination of a reservoir, a sanding control valve mechanism, a communication connecting said reservoir and said valve mechanism through which fluid under pressure is supplied in one direction at one time under the control of said valve mechanism to charge said reservoir and through which fluid under pressure is supplied in the opposite direction at another time, under the control of said valve mechanism, to effect a sanding operation, valve means interposed in said communication operative according to the speed of rotation of the driver wheels in a manner to close said communication whenever the speed of rotation of the driver wheels is less than a certain speed, and a one-way valve disposed in by-passing relation to said speed responsive valve means for permitting flow of fluid under pressure to charge said reservoir.

9. A braking and sanding control apparatus for a vehicle having driver wheels, comprising valve means operative to effect a brake application on said driver wheels, other valve means operative to effect a sanding operation, a pair of levers individually mounted on different fixed fulcrums and cooperating in a manner such that either one is effective when moved to cause operation of both of said valve means, and individual fluid pressure controlled means for each of said levers, each of said fluid pressure controlled means being operative to move its respective lever independently of the other fluid pressure controlled means.

10. In a sanding and brake control apparatus for a vehicle having driver wheels, the combination with a source of supply of fluid under pressure, of a sanding reservoir and a braking reservoir, charging valve means operable out of one position in which it effects a charging of each of said reservoirs from said source of supply of fluid under pressure, to another position in which it terminates said charging, other valve means operable upon said charging valve means being moved to said other position to supply fluid under pressure from said sanding reservoir to cause a sanding operation and to supply fluid under pressure from said braking reservoir to cause a brake application upon said driver wheels, and fluid pressure controlled means for operating said valve means.

11. A fluid pressure control apparatus comprising, in combination, two separately operable fluid pressure responsive means, a single valve means controlled by said fluid pressure responsive means effective at one time to cause a desired operation, and operative at another time, in response to operational movement of either one of said fluid pressure responsive means without movement of the other fluid pressure responsive means, to effect a second desired operation, and control means for selectively causing operational movement of only one of said fluid pressure responsive means at any one time.

12. A fluid pressure control apparatus comprising, in combination, valve means having one position in which it establishes a communication through which fluid under pressure may be supplied for one desired purpose, two fluid pressure responsive means, actuating means associating said fluid pressure responsive means and said valve means so that each fluid pressure responsive means may operate the valve means, without operation of the other fluid pressure responsive means, out of said one position to a different position in which said valve means closes said communication and establishes a different communication through which fluid under pressure may be supplied for a second desired purpose, and control means for effecting variations of fluid pressure selectively on either one or the other of said fluid pressure responsive means.

13. A fluid pressure control apparatus for a vehicle having driver wheels, in combination, a first reservoir, a second reservoir, a source of supply of fluid under pressure, means for causing fluid under pressure to be supplied from said source of supply to charge said first and said second reservoirs, a sanding device, a brake cylinder, valve means operative to establish a communication through which fluid under pressure is supplied from said first reservoir to said brake cylinder to effect a brake application on said driver wheels and simultaneously to establish a communication through which fluid under pressure is supplied from said second reservoir to said sanding device to effect a sanding operation, fluid pressure responsive means, actuating means associating said fluid pressure responsive means and said valve means so that said fluid pressure responsive means may operate the valve means, and wheel spin detecting means operatively responsive to the spinning of the driver wheels of the vehicle during propulsion to cause a fluid pressure force to be effective upon said fluid pressure responsive means to operate said valve means to establish said communication from said first reservoir to said brake cylinder and said communication from said second reservoir to said sanding device.

14. In a brake and sanding control apparatus for a vehicle having driver wheels, the combination with a source of supply of fluid under pressure, a sanding device, and a brake cylinder, of a first reservoir, a second reservoir, means for causing fluid under pressure to be supplied from said source of supply to charge said first and said second reservoirs, valve means operative to establish a communication through which fluid under pressure is supplied from said first reservoir to said brake cylinder to effect a brake application on said driver wheels and simultaneously to establish a communication through which fluid under pressure is supplied from said second reservoir to said sanding device to effect a sanding operation, fluid pressure responsive means for operating said valve means, said fluid pressure responsive means having a first chamber at one side and a second chamber at the opposite side thereof, operator's control means for establishing substantially equal pressures in both of said chambers during propulsion of the vehicle, and wheel spin detecting means operatively responsive to spinning of the driver wheels of the vehicle during propulsion for effecting a reduction of pressure in one of said chambers whereby to cause a fluid pressure force in the other of said chambers to be effective upon said fluid pressure responsive means to operate said supply valve means to establish said communications.

15. In a brake and sanding control apparatus for a vehicle having driving wheels, in combination, a source of fluid pressure, a fluid pressure reservoir having two separate compartments, a first fluid pressure communication, braking and sanding control valve mechanism having one position in which it establishes communication through which fluid under pressure may be supplied from said source to said first communication, a second fluid pressure communication connecting one of the said reservoir compartments to the said first communication and through which charging of said one compartment is effected, check valve means interposed in said second communication for preventing back flow of fluid under pressure from said one compartment through the said second communication, a third fluid pressure communication, a fourth fluid pressure communication, each of said third and fourth communications providing a connection from the other of said reservoir compartments to the said first communication through which charging of said other compartment is effected, check valve means interposed in said third communication for preventing back flow of fluid under pressure from said other compartment through the said third communication, and valve means operatively responsive to the speed of the driver wheels of the vehicle and effective above a chosen speed to permit back flow of fluid under pressure from said other compartment through said fourth communication to said first communication and being effective when the speed of the driver wheels is below said chosen speed to prevent back flow of fluid under pressure from said other compartment to said first communication, said control valve mechanism being operative out of its said one position to a different position in which it terminates the supply of fluid under pressure to said first communication and establishes a communication through which fluid under pressure may be supplied from said one compartment to effect a brake application and also a communication through which fluid under pressure is supplied from said other compartment by way of said fourth and first communications to effect a sanding operation subject to the control of said speed responsive valve means.

16. A control apparatus comprising in combination, two fluid pressure responsive means each operable independently of the other, valve means operative under the control of only one or only the other of said fluid pressure responsive means to effect a desired control operation, operator's control means for selectively establishing two opposing balanced fluid pressure forces on only one or on only the other of said two fluid pressure responsive means at any one time, and control means operative to vary one of the said fluid pressure forces established on one or on the other of said fluid pressure responsive means to cause that fluid pressure responsive means to effect operation of said valve means.

17. In a brake and sanding control apparatus for the driving wheels of a vehicle, in combination, valve means for effecting a brake application on said wheels and a sanding operation, wheel slip means responsive to slipping of said wheels, one fluid pressure means responsive to wheel slipping operation of said wheel slip means during propulsion of the vehicle to cause operation of said valve means, other fluid pressure means responsive to wheel slipping operation of said wheel slip means during braking of said vehicle to also cause operation of said valve means, and means for preventing application of brakes by said valve means upon operation of said other fluid pressure means.

WALLACE F. POORE.

REFERENCES CITED

The following references are of record in the file of this patent:

UNITED STATES PATENTS

| Number | Name | Date |
|---|---|---|
| 2,170,766 | Rieger | Aug. 22, 1939 |
| 2,193,240 | Schmidt | Mar. 12, 1940 |
| 2,232,914 | Hewitt | Feb. 25, 1941 |
| 2,257,310 | Sorensen | Sept. 30, 1941 |